US012785548B2

(12) United States Patent
Routledge

(10) Patent No.: US 12,785,548 B2
(45) Date of Patent: Nov. 3, 2026

(54) PHASE SHEDDING IN PARALLEL POWER CONVERTERS

(71) Applicant: Murata Manufacturing Co., Ltd., Kyoto (JP)

(72) Inventor: Antony Christopher Routledge, Oakley (GB)

(73) Assignee: Murata Manufacturing Co., Ltd., Kyoto (JP)

( * ) Notice: Subject to any disclaimer, the term of this patent is extended or adjusted under 35 U.S.C. 154(b) by 625 days.

(21) Appl. No.: 18/185,912

(22) Filed: Mar. 17, 2023

(65) Prior Publication Data

US 2024/0313634 A1 Sep. 19, 2024

(51) Int. Cl.

*H02M 1/36* (2007.01)
*H02M 1/00* (2007.01)
*H02M 3/07* (2006.01)

(52) U.S. Cl.

CPC ........... *H02M 1/36* (2013.01); *H02M 1/0006* (2021.05); *H02M 1/0032* (2021.05); *H02M 3/072* (2021.05)

(58) Field of Classification Search

CPC ...... H02M 1/088; H02M 1/0032; H02M 1/36; H02M 3/1584; H02M 3/07

See application file for complete search history.

(56) References Cited

U.S. PATENT DOCUMENTS

| | | | | |
|---|---|---|---|---|
| 9,203,299 B2 | 12/2015 | Low et al. | | |
| 10,263,514 B1 | 4/2019 | Aboueldahab | | |
| 10,819,237 B1 * | 10/2020 | Petrina | ................ | H02M 3/1582 |
| 2020/0358357 A1 * | 11/2020 | Petrina | ................ | H03K 17/166 |
| 2022/0385178 A1 | 12/2022 | Routledge | | |
| 2023/0070219 A1 | 3/2023 | Aboueldahab et al. | | |

OTHER PUBLICATIONS

Murata, Data Sheet for "High Efficiency Front End DC-DC Converter", PE25200, Document Category: Product Brief, 2021, 6 pgs.

Herzog, Monika, International Search Report and Written Opinion received from the EPO dated Jul. 22, 24 for appln. No. PCT/JP2024/010133, 16 pgs.

* cited by examiner

*Primary Examiner* — Fred E Finch, III

(74) *Attorney, Agent, or Firm* — Haynes and Boone, LLP

(57) ABSTRACT

Methods and circuits that enable parallel operation of power converters such that phase shedding is possible without excessively long startup times. More specifically, embodiments utilize reduced gate-drive (RGD) low-dropout (LDO) circuits within individual power converters to enable parallel power converter systems that support phase shedding while eliminating a "ping pong" effect (synchronization problems). The RGD capability of each parallel power converter allows each power converter to come online asynchronously without affecting other parallel power converters. In particular, the RGD capability allows full power up of the power converters with substantially reduced delays for full charge balancing and soft-start. For example, embodiments of the invention typically have delays for RGD charge balancing measured in hundreds of microseconds, not tens of milliseconds as with charge balancing in conventional, non-RGD power converters.

16 Claims, 12 Drawing Sheets

PHASE SHEDDING IN PARALLEL POWER CONVERTERS

BACKGROUND

(1) Technical Field

This invention relates to electronic circuits, and more particularly to power converter circuits, including DC-DC power converter circuits.

(2) Background

Many electronic products, particularly mobile computing and/or communication products and components (e.g., notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-2V). Still other circuitry may require an intermediate voltage level (e.g., 5-10V). Many applications may require multiple voltage levels at different current rates.

Power converters are often used to generate a lower or higher voltage from a common power source, such as a battery. One type of power converter comprises a converter circuit (e.g., a charge pump based on a switch-capacitor network), control circuitry, and, in some embodiments, auxiliary circuitry such as bias voltage generator(s), a clock generator, a voltage regulator, a voltage control circuit, etc. As used in this disclosure, the term "charge pump" refers to a switched-capacitor network configured to boost (multiply) or buck (divide) $V_{IN}$ to $V_{OUT}$. Examples of such charge pumps include cascade multiplier, Dickson, Ladder, Series-Parallel, Fibonacci, and Doubler switched-capacitor networks, all of which may be configured as a multi-phase or a single-phase network. Switched-capacitor network DC-DC converters are generally integrated circuits (ICs) that may have some external components (such as capacitors) and in most cases are characterized as having a fixed $V_{IN}$ to $V_{OUT}$ conversion ratio (e.g., division by 2 or by 3). An AC-DC power converter may be built up from a DC-DC power converter by, for example, first rectifying an AC input to a DC voltage and then applying the DC voltage to a DC-DC power converter.

To provide greater flexibility to system designers, and to deal with applications where a power source may change, thus requiring different conversion ratios (e.g., as a battery discharges and outputs a lower voltage, or when the power source to a device is switched between a battery and an AC-DC power line source), it is useful to utilize a DC-DC power converter having a selectable conversion ratio. For example, U.S. Pat. No. 10,263,514 B1, issued Apr. 16, 2019, entitled "Selectable Conversion Ratio DC-DC Converter", assigned to the assignee of the present invention and hereby incorporated in its entirety by this reference, describes a Dickson DC-DC power converter that may be switched between a divide-by-2 mode of operation and a divide-by-3 mode of operation. As another example, U.S. Pat. No. 9,203,299 B2, issued Dec. 1, 2015, entitled "Controller-Driven Reconfiguration of Switched-Capacitor Power Converter", assigned to the assignee of the present invention and hereby incorporated in its entirety by this reference, describes other DC-DC power converter architectures having reconfigurable conversion ratios.

In some applications, it may be useful to connect multiple DC-DC power converters in parallel to increase the available current for a load. For example, if a maximum 100 W output is needed for a particular load, then ten 10 W power converter integrated circuits (ICs) may be coupled in parallel. However, at lighter loads, it may be useful to turn one or more of the ICs OFF to improve light load efficiency, a characteristic also known as "phase shedding". For example, FIG. 1A is a block diagram showing four parallel prior art divide-by-2 power converter ICs 102*a*-102*d* (generically, "102*x*") coupled in parallel. In the illustrated example, each IC 102*x* has a $V_{IN}$ terminal coupled to a 12V voltage source (e.g., a battery) and outputs 6V from a $V_{OUT}$ terminal to a common bus 104.

Connecting power converters in the form of ICs to a common output is difficult, especially for power converters that have several stages of powering-up, including capacitor charge balancing stage and a "soft" start (limited current) stage to protect against destructive in-rush current and to limit power dissipation within an IC (particularly in fault cases such as shorted output terminals). Conventional stand-alone power converter ICs tend to rely on a single external pull-up "power good" (also known as "PGOOD") pin to control whether a power converter IC connects to a common output. For example, in FIG. 1A, each IC 102*x* includes a PGOOD terminal (pin) that is coupled through a resistor R to a pull-up voltage $V_{DD}$.

A PGOOD pin is generally an open-drain output, meaning each IC can only pull down on the pin (to a logic LOW, or 0) and an external resistor provides pull-up (to a logic HIGH, or 1). A power converter IC pulls down its own PGOOD pin until the IC is fully ready to provide power to a common output; thus, once a power converter IC is fully ready to provide power to a common output, that IC ceases to pull down its PGOOD pin. However, in a configuration of parallel power converter ICs, after release of its pull-down condition, a power converter IC also monitors the state of its PGOOD pin and generally blocks output from the IC until the PGOOD pin is a logic HIGH, indicating that all power converter ICs are ready to support a load. Accordingly, a collection of parallel power converter ICs using PGOOD logic signals cannot commence operation until all ICs cease pulling down their respective PGOOD pin.

A number parallel operation schemes generally expect that all power converters are powered up at the same time and powered down at the same time. Accordingly, such parallel operation schemes do not support phase shedding, since powering up a power converter that has been turned OFF necessitates that the power converter pull-down its PGOOD pin—which causes the remaining power converters to curtail their respective outputs.

Further, if two or more power converters are OFF, bringing them to an ON state can result in a "ping-pong" effect if they are out of sync with respect to their startup stages. For example, each power converter generally pulls its PGOOD pin LOW during an initialization stage, then goes through a capacitor charge balancing stage and a soft-start stage, at which point the first power converter releases its PGOOD pin. However, if the PGOOD pin signal of a first power converter is still LOW because a second power converter is not in sync with respect to releasing its PGOOD pin, then the first power converter should assume there is an error and go into a cool down period to prevent the first power converter from overheating and thereafter restart the startup process. The first power converter needs to ensure it cools for longer than it was heated to make sure there is no slow temperature rise, and accordingly the cool down period may be quite lengthy; typically the cool down time is greater than the soft-start time to avoid a cumulative temperature rise. This decreases the "overlap" time where both power converters can power up at the same time. The two power converters can "ping pong" until they both release their respective PGOOD pins at the same time, which can lead to power up times measured in seconds. FIG. 1B is a diagram of state versus time showing an example of the difference in time of the occurrences of PGOOD checks for two power converters, PC #1 and PC #2, caused by different charge balancing phase durations. With more parallel coupled power converters, the less chance of successful power up.

Accordingly, it would be useful to enable parallel operation of power converters such that phase shedding is possible without excessively long startup times.

SUMMARY

The present invention encompasses methods and circuits that enable parallel operation of power converters such that phase shedding is possible without excessively long startup times. More specifically, embodiments utilize reduced gate-drive (RGD) low-dropout (LDO) circuits within individual power converters to enable parallel power converter systems that support phase shedding while eliminating the "ping pong" effect. The RGD capability of each parallel power converter allows each power converter to come online asynchronously without affecting other parallel power converters. In particular, the RGD capability allows full power up of the power converters with substantially reduced delays for full charge balancing and soft-start. For example, embodiments of the invention typically have delays for RGD charge balancing measured in hundreds of microseconds, not tens of milliseconds as with charge balancing in conventional, non-RGD power converters.

One embodiment enables application of an output of a first power converter having an RGD capability to an output of at least a second power converter by enabling the RGD capability of the first power converter to limit current through the output of the first power converter to a first level and for a sufficient time to balance charge of at least one fly capacitor connected to the first power converter. If the output voltage of the first power converter is greater than a threshold voltage, then the RGD capability of the first power converter is disabled, allow full gate-drive operation.

Another embodiment provides for fast startup of a plurality of power converters connected in parallel to a common output, in which each one of the plurality of power converters: sets a first indicator signal (CGOOD) to a first state (e.g., LOW) to indicate that charge balancing of the power converter has not completed; sets a second indicator signal (PGOOD) to a first state to indicate that the power converter is not ready to enter a full power mode of operation; balances charge on at least one fly capacitor connected to the power converter; sets the first indicator signal to a second state (e.g., HIGH) to indicate that charge balancing of the power converter has completed; waits for receipt of first indicator signals in the second state from all other power converters and then performs a soft-start of the power converter; and sets the second indicator signal to a second state to indicate that the soft-start of the power converter has completed.

The details of one or more embodiments of the invention are set forth in the accompanying drawings and the description below. Other features, objects, and advantages of the invention should be apparent from the description and drawings, and from the claims.

DESCRIPTION OF THE DRAWINGS

Like reference numbers and designations in the various drawings indicate like elements.

DETAILED DESCRIPTION

The present invention encompasses methods and circuits that enable parallel operation of power converters such that phase shedding is possible without excessively long startup times. More specifically, embodiments utilize reduced gate-drive (RGD) low-dropout (LDO) circuits within individual power converters to enable parallel power converter systems that support phase shedding while eliminating the "ping pong" effect. The RGD capability of each parallel power converter allows each power converter to come online asynchronously without affecting other parallel power converters. In particular, the RGD capability allows full power up of the power converters with substantially reduced delays for full charge balancing and soft-start. For example, embodiments of the invention typically have delays for RGD charge balancing measured in hundreds of microseconds, not tens of milliseconds as with charge balancing in conventional, non-RGD power converters.

Example Power Converter

For purposes of explaining the various embodiments of the invention, it is useful to consider an example of a particular DC-DC power converter. However, it should be understood that the invention is not limited to this specific power converter example, and may be used with a wide variety of power converter architectures as well as in such circuits as AC-DC converters, H-bridge polarity switchers, and motor controllers and drivers.

Figure 2:
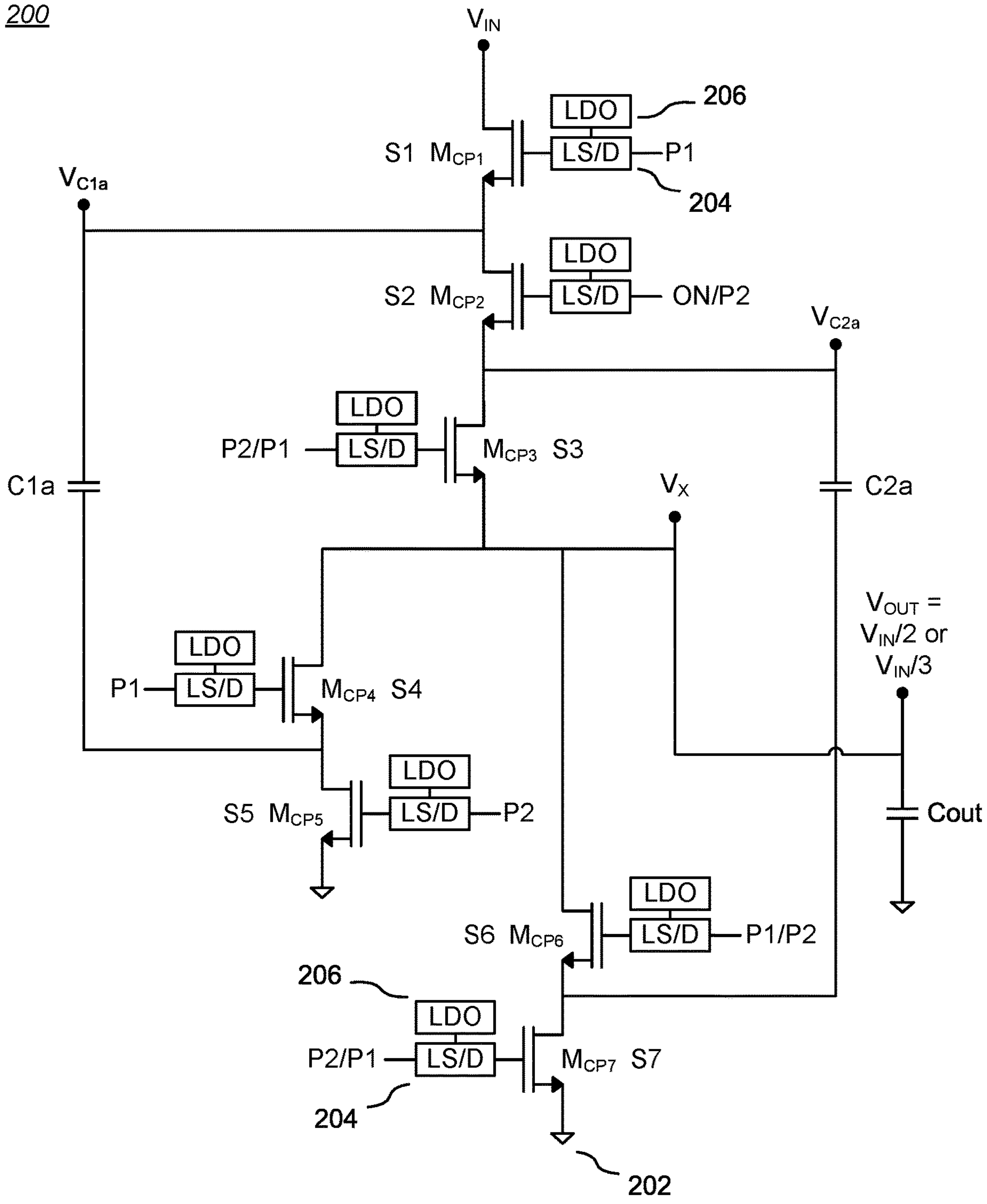
FIG. 2 is a circuit diagram of one embodiment of a DC-DC selectable conversion ratio power converter.

FIG. 2 is a circuit diagram of one embodiment of a DC-DC selectable conversion-ratio power converter 200. The specific illustrated power converter 200 may be selectably configured to be either a divide-by-2 Dickson converter or a divide-by-3 Dickson converter using the same basic circuit. The same power converter 200 may be used for DC-to-DC boost conversion by reversing the voltage input and voltage output. However, the invention is not limited to use with selectable conversion ratio power converters, but also may be used with fixed conversion-ratio power converters.

The illustrated power converter 200 is coupled between a voltage source $V_{IN}$ and a reference potential 202 such as circuit ground. The power converter 200 includes 3 series-connected switches S1-S3 coupled in series to a first branch comprising 2 series-connected switches S4-S5, and to a second branch comprising 2 series-connected switches S6-S7. Each switch may comprise, for example, one or more FETs, including one or more MOSFETs. Depending on the output ratio configuration (divide-by-2 or divide-by-3), the power converter 200 should generate an output voltage at a node $V_X$ that is coupled to an output capacitor $C_{OUT}$.

Coupled between a first upper pair of switches S1, S2 and a first branch pair of switches S4, S5 is a first capacitor C1*a*, and coupled between a second upper pair of switches S2, S3 and a second branch pair of switches S6, S7 is a second capacitor C2*a*. The first capacitor C1*a*, when charged, has a voltage across it at node $V_{C1a}$ that is a function of the current conversion ratio—the voltage is $V_X$ if in a divide-by-2 mode, and $2V_X$ in a divide-by-3 mode. The second capacitor C2*a*, when charged, has a voltage of $V_X$ across it at node $V_{C2a}$.

At least some of the switches S1-S7 may be selectively controlled to be in an ON (conductive) or OFF (circuiting) state by control circuitry (not shown). At least some of the switches S1-S7 may be selectively coupled to one of two non-overlapping complementary clock phases, P1 or P2. Some of the switches S1-S7 may be permanently coupled to one of the two complementary clock phases, P1 or P2. TABLE 1 below shows the configuration of the state or associated clock phase for each of the switches S1-S7 of the power converter 200 for both a divide-by-2 configuration and a divide-by-3 configuration.

TABLE 1

| Divide-by-2 Configuration | Divide-by-3 Configuration |
|---|---|
| S1 = P1 | S1 = P1 |
| S2 = ON | S2 = P2 |
| S3 = P2 | S3 = P1 |
| S4 = P1 | S4 = P1 |
| S5 = P2 | S5 = P2 |
| S6 = P1 | S6 = P2 |
| S7 = P2 | S7 = P1 |

In either configuration, the non-overlapping complementary clock signals P1, P2 open or close associated power switches, causing charge to be transferred from the fly capacitors C1*a*, C2*a*, into $C_{OUT}$, resulting in a voltage $V_{OUT}$ across $C_{OUT}$ of either $V_{IN}/2$ or $V_{IN}/3$. Further details of the operation of this and similar DC-DC selectable conversion ratio power converters are set forth in U.S. Pat. No. 10,263,514 B1.

In some embodiments, the circuitry shown in FIG. 2 may be replicated in parallel but operated with different P1, P2 clock signal phasing (e.g., 180° apart from the P1 and P2 clock signals for the illustrated power converter 200) to provide output ripple smoothing and additional current capacity. Additional parallel circuit sections may be included to provide even more current capacity.

In a FET-based implementation, ON/OFF control signals or the P1/P2 clock phase signals are coupled to the gate of each switch S1-S7 through at least a driver circuit, and in many cases through both a level shifter circuit and a driver circuit. In either case, each driver circuit or level shifter/driver circuit may be powered by a regulated power supply tailored to voltage requirements of each switch S1-S7. The source of the energy for the regulated power supply may come from a variety of different sources, including $V_{IN}$ or even another phase of the power converter 200.

For example, referring to FIG. 2, power switches S1-S7 are shown as implemented with N-type MOSFETs $M_{CP1}$-$M_{CP7}$ (generically, "$M_{CPx}$"). The gate of each FET $M_{CPx}$ is coupled to a level-shifter/driver circuit 204 (not all instances are numbered to avoid clutter). In some cases (e.g., power switches S6 and S7), the level-shifter/driver circuit 204 may include only a driver, as level shifting may not be needed (noting that if a power switch control path does not contain a level shifter, it may be necessary to add a circuit element, such as a buffer, to emulate the delay of the level shifter to avoid timing issues). A level shifter translates an input signal from one voltage domain (e.g., digital logic voltages) to another voltage domain (e.g., transistor control voltages). The output of the level shifter thus follows the input signal but in a different voltage range. Power to each level-shifter/driver circuit 204 is provided by a corresponding low-dropout (LDO) circuit 206. A clock phase (P1 or P2 in this example) or an ON/OFF control signal may be coupled through a level-shifter/driver circuit 204 to the gate of the corresponding power FET $M_{CPx}$.

Reduced Gate Drive Low-Dropout Circuits

Embodiments of the present invention, one of which is described in detail in the next section, take advantage of certain "reduced gate drive" (RGD) configurations of the low-dropout (LDO) circuits 206 coupled to the level-shifter/driver circuit 204 shown in FIG. 2. Such RGD LDO configurations are described in detail in U.S. patent application Ser. No. 17/331,594, filed May 26, 2021, entitled "Dynamic Division Ratio Charge Pump Switching", assigned to the assignee of the present invention, the contents of which are incorporated by reference.

As background, in U.S. patent application Ser. No. 17/331,594, it was realized that the driver circuitry for at least FET $M_{CP1}$ (see FIG. 2 of the present application) could be adapted to limit current through a power converter 200. In particular, it was realized that the power converter FET switches $M_{CPx}$ are normally operated in an "over-driven" or "full drive" condition when set to an ON (conducting) state. An overdriven FET gate creates a stronger conduction channel, effectively lowering the ON resistance, $R_{ON}$, of the FET. With that insight, it was further realized that increasing $R_{ON}$ for some or all of the power FETs in a power converter (especially FET $M_{CP1}$) during potentially damaging events (e.g., during startup or when dynamically re-configuring the conversion ratio of the power converter) would reduce current flow through the FETs and thus protect against excessive current spikes.

A general problem with many FET-based DC-DC power converter architectures is that excessive current in-rush needs to be avoided during startup of the power converter. For example, for a selectable conversion ratio DC-DC converter of the type shown in U.S. Pat. No. 10,263,514 B1, absent sufficient guard circuitry, when an input voltage $V_{IN}$ is first applied, none of the capacitors (sometimes known as "fly capacitors") would be charged initially and accordingly current rushes into the circuit. For instance, if the ON resistance, $R_{ON}$, of the FET power switches is 1 milliohm (0.001 ohms), and $V_{IN}$ is 10V, then as a result of Ohm's law, V=I×R, the in-rush current will be a spike of about 10,000 amps. In integrated circuit implementations, parasitic inductances exist (for example, due to on-die conductor routing and printed circuit board conductor routing) which transform a current spike to a voltage spike in accordance with inductor theory: V=L×dI/dt. Such voltage spikes electrically overstress the charge pump power switches, affecting their reliability, potentially to destruction. For a 1 ns 100 A pulse to generate 10V across the charge pump power switches, the parasitic inductance need only be about 100 pH. The resulting 10V spike may exceed the breakdown voltage of many of the FET switches, and of course, a larger current spike results in a larger voltage spike for the same parasitic inductance.

A related problem occurs when the fly capacitors of a DC-DC power converter are out of balance, meaning that a charge difference exists between fly capacitors connected by power switches. If charge balance is not maintained, current spikes and resulting damaging voltage spikes can occur.

As described in U.S. patent application Ser. No. 17/331,594 referenced above, at least some of the LDO circuits 206 may be configured to selectively increase $R_{ON}$ for an associated power FET in a power converter by actively controlling the driver voltage to the gate of the power FET. During normal power converter operation, the power FET driver voltage may be set to overdrive the FET gate to lower $R_{ON}$ to a desired level that allows high current flow for a particular application. However, for other scenarios (e.g., during soft-startup, charge balancing, or conversion ratio mode changes), the power FET driver voltage may be reduced so as to increase $R_{ON}$ and thus impede current flow through the power FET to a desired level.

Figure 3:
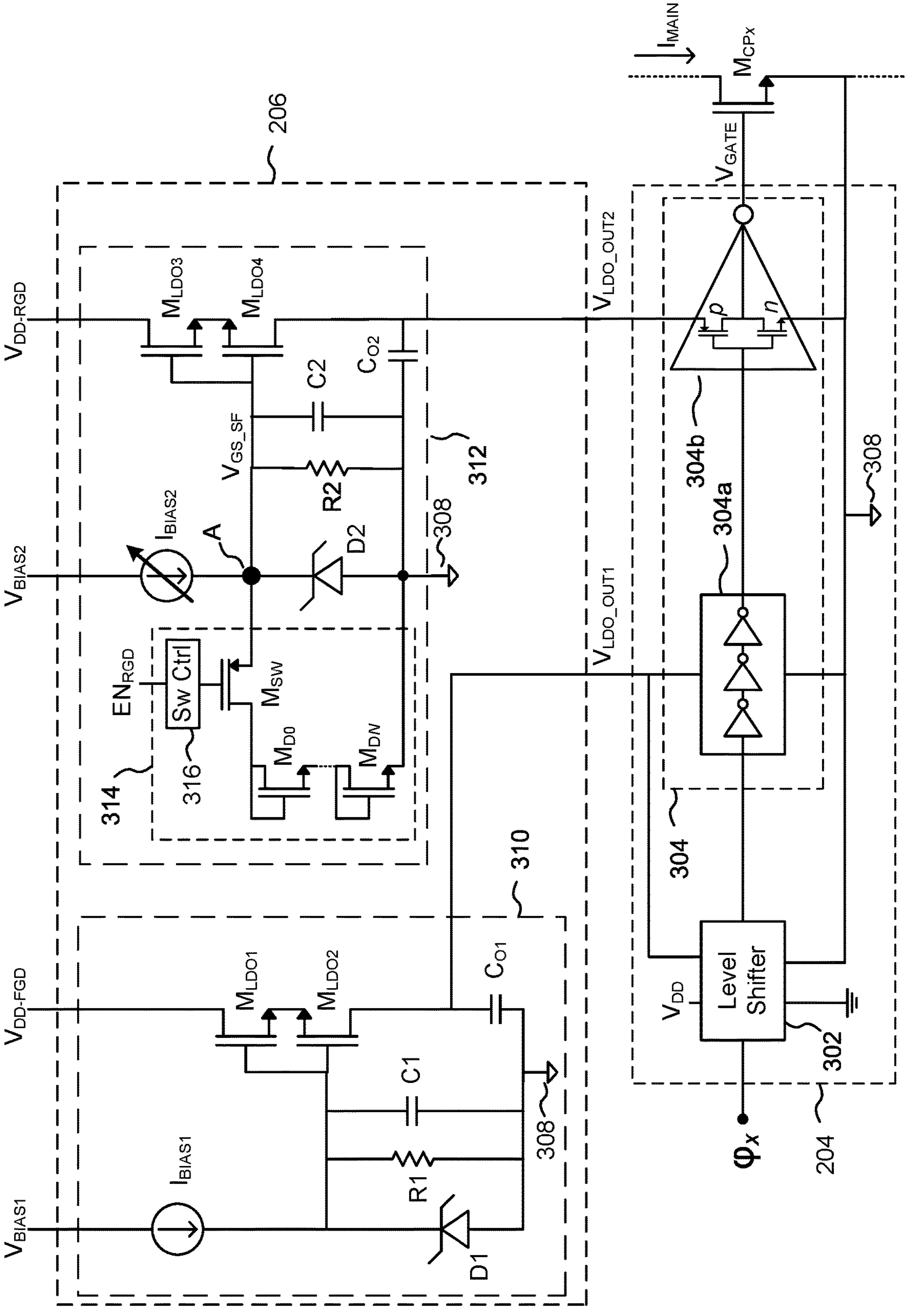
FIG. 3 is a schematic diagram of one embodiment of the level-shifter/driver block and the LDO block of FIG. 2.

FIG. 3 is a schematic diagram of one embodiment of the level-shifter/driver block 204 and the LDO block 206 of FIG. 2. As in FIG. 2, the LDO block 206 provides power to a level-shifter/driver block 204 coupled to the gate of an associated power FET $M_{CPx}$. The input to the level-shifter/driver block 204, $\varphi_x$ (e.g., either clock signal P1 or clock signal P2, or an ON or OFF control signal), is applied to the input of a level shifter 302. The output of the level shifter 302 is coupled to the input of a driver circuit 304, the output of which is coupled to the gate of the associated FET $M_{CPx}$. In the illustrated example, the driver circuit 304 includes a pre-driver 304*a* (comprising a set of three series-coupled inverters in this example) and a series-coupled final driver 304*b*. Internally, the final driver 304*b* has at least one NMOS FET n and one PMOS FET p with coupled conduction channels, drain-to-drain, with each FET n, p having a gate driven by the output of the pre-driver 304*a*. The drains of PMOS FET p and of NMOS FET n are coupled to the gate of the associated power FET $M_{CPx}$. Note that for some embodiments, the level shifter 302 may be interposed after the pre-driver 304*a*, or between a pair of the inverters comprising the pre-driver 304*a*, although a high drive at the output of the level shifter may be needed.

In some embodiments, the inverters may increase in physical size from inverter to inverter in order to provide sufficient current drive capability to charge or discharge the gate of FET $M_{CPx}$. For example, in a driver circuit 304 having three series-coupled inverters in the pre-driver 304*a*, the first inverter may have a relative size of "1", the second inverter may be 3 times larger than the first inverter, and the third inverter may be 9 times larger than the first inverter. Lastly, the final driver 304*b* may be 27 times larger than the first inverter in the pre-driver 304*a*. The multipliers for the stages may differ from the 1×, 3×, 9×, and 27× ratios, although generally each stage is larger than the previous one to avoid having very slow rising and falling edges. In alternative embodiments, the number of inverter stages may be fewer or greater, and non-inverting stages (buffer amplifiers) may be used rather than inverting stages. Accordingly, the illustrated driver circuit 304 is exemplary only, and other circuits may be used to couple the output of the level shifter 302 to the gate of the associated FET $M_{CPx}$.

Power to the level shifter 302 and the driver circuit 304 is provided by the LDO block 206. In the illustrated example, the power source for the level shifter 302 and the pre-driver 304*a* is provided by a first LDO section 310. The first LDO section 310 comprises a source follower (common drain) amplifier circuit that includes a pair of FETs $M_{LDO1}$ and $M_{LDO2}$ having their conduction channels (between drain and source) coupled in series, their gates coupled in common, and their sources coupled together. The conduction channels of FETs $M_{LDO1}$, $M_{LDO2}$ are coupled between a capacitor $C_{O1}$ and a supply voltage $V_{DD\text{-}FGD}$. The capacitor $C_{O1}$ is also coupled to a floating reference potential 308. The source of FET $M_{LDO1}$ provides a drive voltage $V_{LDO\_OUT1}$ to the level shifter 302 and the pre-driver 304*a* (FET $M_{LDO2}$ is an optional protection device).

A current source $I_{BIAS1}$ is coupled in series with a Zener diode D1 between a supply voltage $V_{BIAS1}$ and the reference potential 308. A current source may be configured from resistors, transistors, and/or diodes using a variety of circuits. One terminal of the Zener diode D1 is coupled to the gates of the FETs $M_{LDO1}$, $M_{LDO2}$. A resistor R1 and a capacitor C1 are coupled in parallel with the Zener diode D1. The resistor R1 serves to discharge the gates of the FETs $M_{LDO1}$, $M_{LDO2}$ when transitioning those devices from an ON state to an OFF state. Since the output of the LDO block 206 drives a switching circuit, there is potential for noise to be coupled to the gate of $M_{LDO1}$ which may modulate the output drive voltage $V_{LDO\_OUT1}$. Such noise is mitigated by capacitor C1, which also decouples glitches from the power supply. Alternative embodiments may use a push-pull drive to the gate of $M_{LDO1}$.

The output of the current source $V_{BIAS1}$ before the Zener diode D1 provides an essentially constant bias voltage to the gates of the FETs $M_{LDO1}$, $M_{LDO2}$. The bias current $I_{BIAS1}$ flows through the Zener diode D1 and ensures that the diode is always in reverse bias. Unlike a conventional diode that blocks any flow of current through itself when reverse biased, as soon as the reverse voltage reaches a pre-determined value, a Zener diode begins to conduct. This applied reverse voltage remains almost constant even with large changes in current (so long as the current remains between a breakdown minimum current and a maximum current rating for the Zener diode). A Zener diode continues to regulate its voltage until the holding current of the diode falls below the minimum current value in the reverse breakdown region.

The final driver 304*b* is powered by a second LDO section 312 that includes a pair of cascode FETs $M_{LDO3}$ and $M_{LDO4}$ having their conduction channels (between drain and source) coupled between a supply voltage $V_{DD\text{-}RGD}$ and the final driver 304*b*. The gates of FETs $M_{LDO3}$, $M_{LDO4}$ are coupled to a separate gate driver circuit that is independent of the gate driving circuitry for FETs $M_{LDO1}$ and $M_{LDO2}$, and the sources of FETs $M_{LDO3}$, $M_{LDO4}$ are coupled together (FET $M_{LDO4}$ is an optional protection device). A principal function of the gate driver circuit of the second LDO section 312 is to enable at least two different voltage levels at Node A to be coupled to the gate of FET $M_{LDO3}$, which in turn determines the output voltage level $V_{GATE}$ provided by the final driver 304*b* driving the associated power FET $M_{CPx}$. The associated power FET $M_{CPx}$ thus can be placed into (1) an overdriven or "full gate-drive" ON state having low $R_{ON}$ for normal power converter operation, or (2) at least one current-limiting reduced gate-drive ON state having a higher $R_{ON}$ selected to provide protection against potentially damaging events (e.g., in-rush or charge transfer current), such as during dynamic re-configuration of the conversion ratio of the power converter, during power converter startup, when balancing charge among fly capacitors within the power converter, or during fault events such as short circuit events or thermal overloads.

A resistor R2 and a capacitor C2 are coupled in parallel with the Zener diode D2 and function in essentially the same manner as resistor R1 and capacitor C1. The resistor R2 serves to discharge the gates of the FETs $M_{LDO3}$, $M_{LDO4}$ when transitioning those devices from an ON state to an OFF state. Capacitor C2 mitigates noise on $V_{LDO\_OUT2}$, a drive voltage output of the LDO block 206, and decouples glitches from the power supply A reservoir capacitor $C_{O2}$ is coupled between the drain of FET $M_{LDO4}$ and the floating reference potential 308 and provides some initial charge to the gate of the FET $M_{CPx}$ as well as isolation from the floating reference potential 308.

The gate driver circuit for FETs $M_{LDO3}$, $M_{LDO4}$ includes a variable current source $I_{BIAS2}$ coupled in series with a Zener diode D2 between a supply voltage $V_{BIAS2}$ and the reference potential 308. The gates of FETs $M_{LDO3}$, $M_{LDO4}$ are coupled to Node A between the current source $I_{BIAS2}$ and the Zener diode D2. The output of the current source $I_{BIAS2}$ before the Zener diode D2 at Node A provides an essentially constant bias voltage $V_{GS\_SF}$ to the gates of FET FETs $M_{LDO3}$, $M_{LDO4}$. The source of the FET $M_{LDO3}$ provides the drive voltage $V_{LDO\_OUT2}$ to the final driver 304*b*.

In parallel with the Zener diode D2 is a voltage control circuit 314 comprising a reduced gated-drive P-type FET switch $M_{SW}$ series-coupled to a first diode-connected FET $M_{D0}$ and at least one additional diode-connected FET $M_{DN}$, where N≥1. The gate of FET switch $M_{SW}$ is coupled to a switch control block 316 that is coupled to an ENABLE signal $EN_{RGD}$; details of the switch control block 316 are discussed below.

The conduction channels of the first diode-connected FET $M_{D0}$ and the at least one additional diode-connected FET $M_{DN}$ are coupled in series. As illustrated, the conduction channel of the switch FET switch $M_{SW}$ is coupled between Node A and the conduction channel of the first diode-connected FET $M_{D0}$. The conduction channel of the last-in-series additional diode-connected FET $M_{DN}$ is coupled to the floating reference potential 308. Note that the switch FET switch $M_{SW}$ may be positioned anywhere along the voltage control circuit 314 to interrupt or enable current flow through that circuit. However, positioning the FET switch $M_{SW}$ as shown in FIG. 3 may reduce parasitic influences on FETs $M_{LDO3}$ and $M_{LDO4}$ due, for example, to the capacitances of diode-connected FETs $M_{D0}$ and/or $M_{DN}$.

A function of the diode-connected FET $M_{D0}$ is to offset FET $M_{LDO3}$, since the threshold voltages of FET $M_{D0}$ and FET $M_{LDO3}$ effectively cancel. A function of the additional diode-connected FETs $M_{DN}$ is to set the current $I_{MAIN}$ through FET $M_{CPx}$ in proportion to the ratio of the sizes of FET $M_{CPx}$ to FET $M_{DN}$ when FET switch $M_{SW}$ is CLOSED and the current mirror function of the voltage control circuit 314 is engaged. More particularly, the current $I_{MAIN}$ through FET $M_{CPx}$ is proportional to the current from the current source $I_{BIAS2}$ and the size ratio of FET $M_{DN}$ to FET $M_{CPx}$. For example, if the current source $I_{BIAS2}$ Output is 1 mA, and FET $M_{CPx}$ is 1,000 times the size of FET $M_{DN}$ (W/L $M_{CPx}$=1000×W/L $M_{DN}$), then the maximum current through FET $M_{CPx}$ will be 1,000×1 mA=1 A. This is achieved by ensuring the gate-to-source voltage $V_{GS}$ of FET $M_{DN}$ is the same as that of FET $M_{CPx}$. The maximum gate voltage of FET $M_{CPx}$ is the voltage at Node A minus the threshold voltage $V_{TH}$ of FET $M_{LDO3}$. Including FET $M_{D0}$ increases the voltage at Node A by a second threshold voltage $V_{GS}$, so the voltage at Node A=($V_{GS}$ of FET $M_{DN}$)+($V_{TH}$ of FET $M_{D0}$), or $2V_{GS}$. If FET $M_{LDO3}$ and FET $M_{D0}$ are matched (ratiometrically), then the maximum the $V_{GS}$ of FET $M_{CPx}$ can reach is the same as the $V_{GS}$ of FET $M_{DN}$, and this equality tracks over process, temperature, etc.

As noted, the diode-connected FET(s) $M_{DN}$ are ratioed in size with respect to FET $M_{CPx}$. In some embodiments, some or all of FETs $M_{LDO1}$, $M_{LDO2}$, $M_{LDO3}$, $M_{LDO4}$, $M_{D0}$ . . . $M_{DN}$, and $M_{CPx}$ may be segmented FETs, meaning that a device intended to function as a large FET is fabricated as multiple (e.g., 10,000) small FETs coupled in parallel (the individual small FETs may be called "fingers", reflecting typical aspects of their physical layout on an IC die). The diode-connected FET(s) $M_{D0}$, $M_{DN}$ may be fabricated using the same technology, but can be made with a much smaller number of FET fingers (e.g., as few as one finger). Because of the illustrated configuration, a small change in current flow through the voltage control circuit 314 affecting the voltage $V_{GS\_SF}$ at the gate of FET $M_{LDO3}$ causes a proportionally larger current flow $I_{MAIN}$ through power FET $M_{CPx}$ determined by the size ratio of FET $M_{CPx}$ to FET $M_{DN}$.

Adding more than one diode-connected FET $M_{DN}$ allows adjustment of the size ratio of FET $M_{CPx}$ to FET $M_{DN}$. For instance, if FET $M_{CPx}$ has a width of 100 and 1,000 fingers, a first FET $M_{DN}$ should also have a width of 100 to match, but may only have 1 finger. Hence the size ratio of FET $M_{DN}$ to FET $M_{CPx}$ is 1,000 to 1, and 1 mA from the current source $I_{BIAS2}$ means 1 A through FET $M_{CPx}$. To change the size ratio to 2,000 to 1, two diode-connected FETs $M_{DN}$ may be coupled in series (source to drain). If the FET width is still 100, the effective number of fingers of the two diode-connected FETs $M_{DN}$ is one-half, giving a size ratio of 2,000 to 1 with respect to FET $M_{CPx}$.

As noted above, an important function of the gate driver circuit is that it provides a selectable amount of regulated gate bias voltage $V_{GS\_SF}$ to FETs $M_{LDO3}$, which in turn controls the power supply to, and voltage output of, the final driver 304*b*. Further, the gate driver circuit and FET $M_{LDO3}$ regulate the current $I_{MAIN}$ through FET $M_{CPx}$ to be directly proportional to the current through FET $M_{DN}$. When FET switch $M_{SW}$ is OPEN, then the voltage control circuit 314 is disconnected from Node A—and therefore from the gate of FET $M_{LDO3}$—and thus has essentially no effect on the output of FET $M_{LDO3}$; accordingly, the final driver 304*b* can fully overdrive the gate of FET $M_{CPx}$ to a selected level determined by the Zener diode D2.

When FET switch $M_{SW}$ is CLOSED—such as during startup of the power converter or when dynamically switching conversion ratios or rebalancing charge amount fly capacitors—then the voltage control circuit 314 operates as a bypass to divert current around diode D2 and lower the voltage at Node A, thus reducing the drive voltage to FET $M_{LDO3}$. The reduced gate-drive voltage to FET $M_{LDO3}$ in turn reduces the power to the final driver 304*b* and thus reduces the gate-drive voltage $V_{GATE}$ to the power FET $M_{CPx}$. Accordingly, FET $M_{CPx}$ has a reduced gate-drive voltage that results in an increased $R_{ON}$ value compared to the $R_{ON}$ value when in a full overdriven state. That increased resistance through at least some of the power FETs $M_{CPx}$ of a power converter inhibits excessive current spikes, thus protecting the power FETs (as well as other coupled circuitry) from large voltage spikes. Selectively varying the $I_{BIAS2}$ current controls the value of $V_{GATE}$ applied to the power FET $M_{CPx}$, thus enabling selection of different increased values of $R_{ON}$.

In some embodiments, reduced gate-drive operation of a power FET $M_{CPx}$ in the ON state to limit current spikes during potentially damaging events may be enabled (triggered) by a control circuit (not shown) as a function of a measured parameter, such as the value of $V_{IN}$, $V_{OUT}$, pump capacitor voltages, or load current, and/or as the result of sensed events, such as short circuit events and/or charge imbalances on the pump capacitors. In some embodiments, reduced gate-drive operation of a power FET $M_{CPx}$ in the ON state to limit current spikes during potentially damaging events may be enabled (triggered) based on an external ENABLE signal $EN_{GRD}$ for FET switch $M_{SW}$ that is asserted in advance of a known impending event, such as dynamic switching of conversion ratios.

The duration of reduced gate-drive operation for the power FETs may be set as a fixed time suitable for a particular application or may be determined based on some criteria. For example, reduced gate-drive operation for the power FETs may be a function of output load, or a function of output load and a selected maximum duration (i.e., a time-out parameter), or a function of the voltage across the fly capacitors having reached some percentage (e.g., 95%) of a desired target level, or some combination of these values and/or the values of other parameters.

An advantage of using diode-connected FETs in the voltage control circuit 314 fabricated using the same technology as the power FETs $M_{CPx}$ (e.g., NMOSFET) is that the devices should essentially have matching characteristics with respect to process/voltage/temperature (PVT) variations.

In summary, a principal function of the gate driver circuit for FET $M_{LDO3}$ is to enable at least two different voltage levels at Node A to be coupled to the gate of FET $M_{LDO3}$. More specifically, the voltage control circuit 314 can selectably shift the voltage at Node A between a first voltage level, in which the voltage control circuit 314 is not engaged (FET switch $M_{SW}$ is OPEN) and at least a second voltage level, in which the voltage control circuit 314 is engaged (FET switch $M_{SW}$ is CLOSED).

It should be appreciated that the second LDO section 312 illustrated in FIG. 3 can be simple to implement, requiring little power and circuit area. However, other devices or circuits that provide the same or similar function may be used in other embodiments. For example, Node A could be coupled through FET switch $M_{SW}$ to an amplifier having a level-shifted reference voltage as an input; the gate voltage $V_{GS\_SF}$ to FET $M_{LDO3}$ may be more accurate but at the expense of complexity, circuit area, and power (and thus efficiency).

Figure 1A:
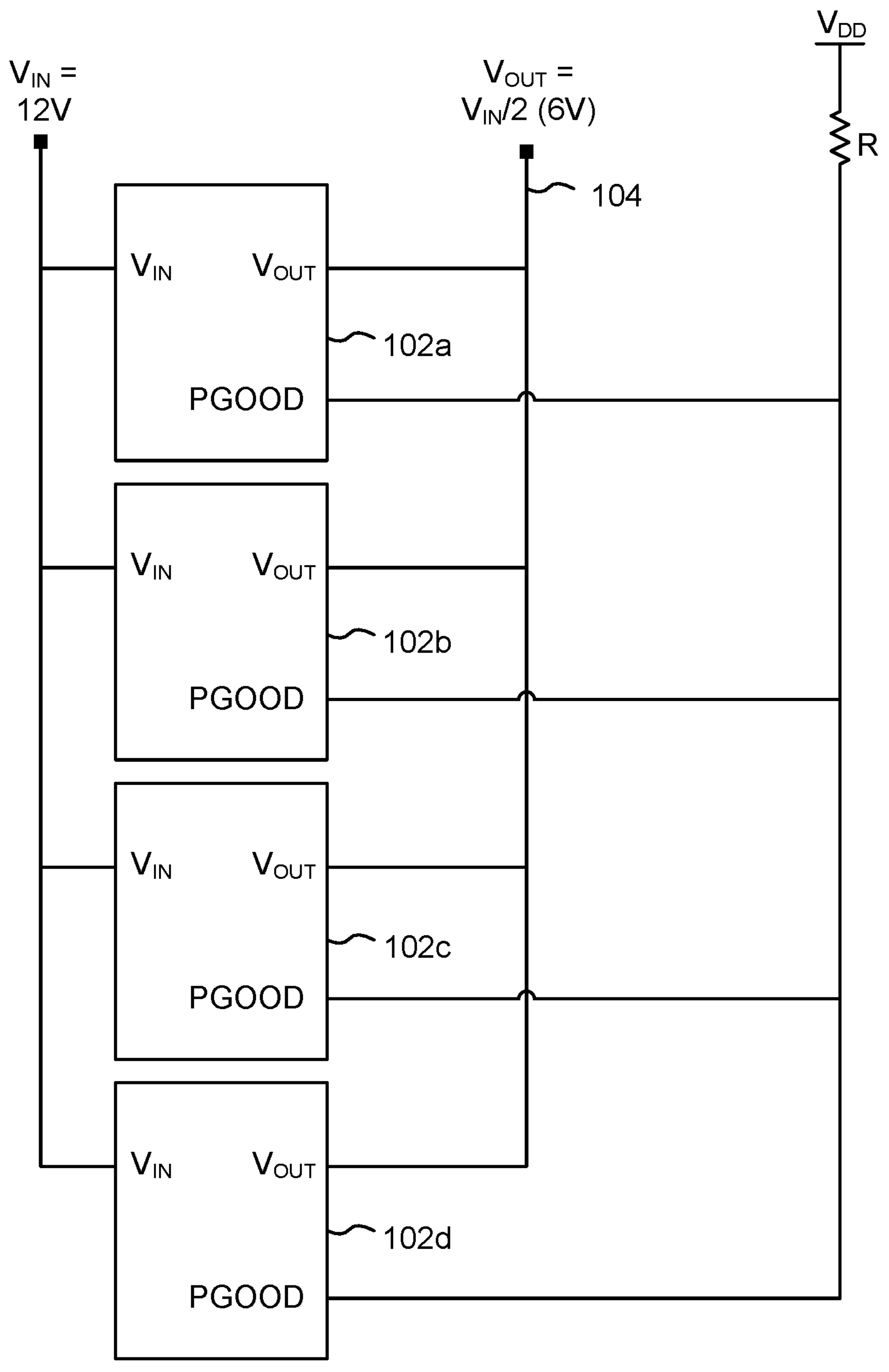
FIG. 1A (Prior Art)
FIG. 1A is a block diagram showing four parallel prior art divide-by-2 power converter ICs coupled in parallel.

Note that the LDO block 206 of FIG. 3, including the second LDO section 312, may be used to power all of the FET switches in a power converter 200 to limit currents through such switches as may be needed (for example, when dynamically changing the conversion ratio of the power converter 200). In some instances, a level shifter 302 circuit would not be required for some FET switches (e.g., power switches S5 and S7 in FIG. 1), in which case $\varphi_x$ may be applied directly to the associated pre-driver 304*a*. Note also that the LDO block 206 may be used to provide a regulated power supply to other types of target circuit, and not just to a level-shifter/driver block 204.

Figure 4:
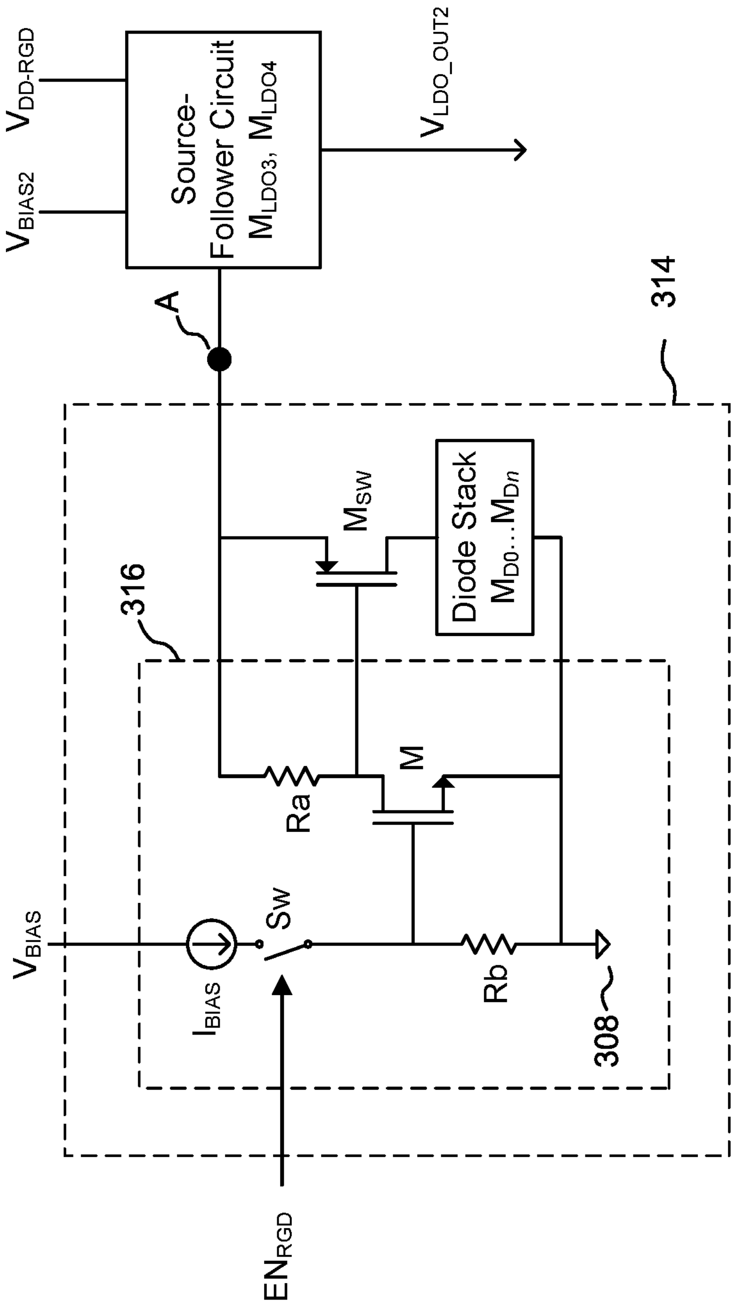
FIG. 4 is a block diagram showing details of one embodiment of a switch control block.

FIG. 4 is a block diagram showing details of one embodiment of a switch control block 316. The switch control block 316 is coupled to components of the voltage control circuit 314 as shown, and includes a NFET M having a first end of its conduction channel coupled by a resistor Ra to node A, and a second end of its conduction channel coupled to the floating reference potential 308. The drain of NFET M is coupled to the gate of the P-type FET switch $M_{SW}$. A current source $I_{BIAS}$, a switch Sw, and a resistor Rb are coupled in series as shown between a voltage $V_{BIAS}$ and the floating reference potential 308. The gate of NFET M is coupled between the current source $I_{BIAS}$ and the resistor Rb. In an alternative embodiment, a standard level shifter may be used to drive the gate of FET switch $M_{SW}$, but possibly at the cost of larger IC area.

In operation, if the ENABLE signal $EN_{RGD}$ is a logical "1", then switch Sw closes, causing NFET M to conducts and pulls the gate of P-type FET switch $M_{SW}$ down to the floating reference potential 308. The result is an application of a negative $V_{GS}$ to the P-type FET switch $M_{SW}$, thus setting $M_{SW}$ to a conductive state (i.e., closing the switch). Conversely, if the ENABLE signal $EN_{RGD}$ is a logical "0", then switch Sw opens and NFET M does not conduct; accordingly, the $V_{GS}$ to the P-type FET switch $M_{SW}$ is zero, thus setting $M_{SW}$ to a non-conductive state (i.e., opening the switch).

The LDO block 206 may provide two or more levels of reduced gate drive. For instance, in an example IC embodiment, the LDO block 206 of FIG. 3 may be configured to provide an RGD that permits about 4 A of current through the associated power FET $M_{CPx}$ during a charge balancing phase, and an RGD that permits about 700 mA of current through the associated power FET $M_{CPx}$ during a soft-start phase when charge-balancing is not needed. The full gate drive may, for example, permit about 9 A or more of current through the associated power FET $M_{CPx}$. The current values listed for this example are for the specific example IC embodiment, and other current values may be selected for different embodiments and applications. Of note, the RGD capability of the LDO block 206 means that a charge pump can be fully operational throughout both a charge balancing phase and a soft-start phase.

Reduced Gate Drive LDO Embodiments

Of note, phase shedding within a set of power converters is only practical if a power converter, once "shed", can be re-enabled and re-connected to the other power converters. The presence of RGD LDO blocks within individual power converters can be leveraged to enable parallel power converter systems that support phase shedding while eliminating the "ping pong" effect because the RGD capability allows each power converter to come online asynchronously without affecting the other power converters. In particular, the RGD capability allows full power up of the power converters with substantially reduced delays for full charge balancing and soft-start. For example, delays for RGD charge balancing in embodiments of the present invention are measured in hundreds of microseconds, not tens of milliseconds as with charge balancing in conventional, non-RGD power converters. By enabling phase shedding, the power consumption of switching multiple FETs in a power converter is saved for every power converter that is disabled.

Figure 5:
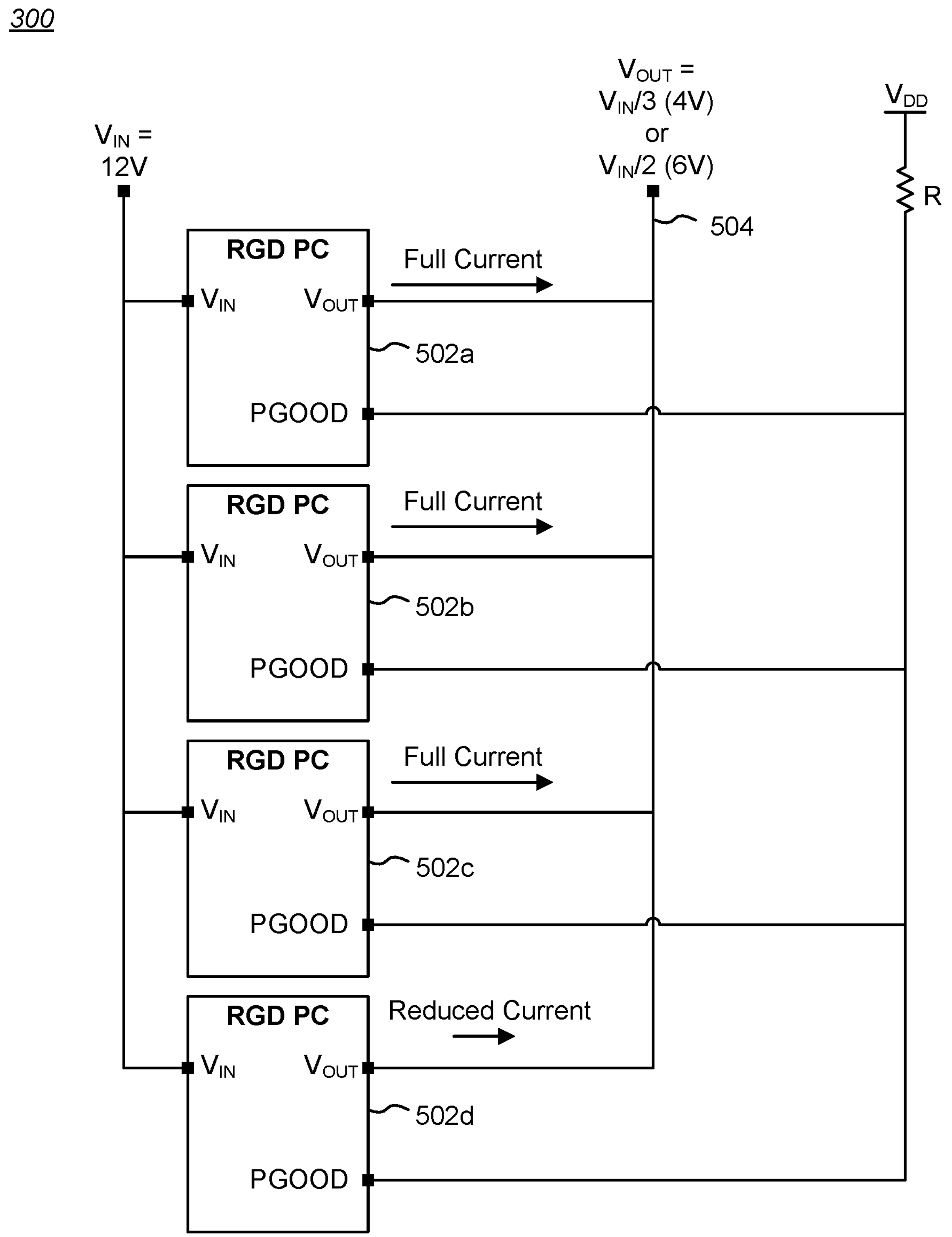
FIG. 5 is a block diagram showing four parallel divide-by-2/divide-by-3 power converter RGD ICs coupled in parallel.

FIG. 5 is a block diagram showing four parallel divide-by-2/divide-by-3 power converter RGD ICs 502*a*-502*d* (generically, "502*x*") coupled in parallel. In the illustrated example, each RGD IC 502*x* has a $V_{IN}$ terminal coupled to a 12V voltage source (e.g., a battery) and outputs either 4V or 6V from a $V_{OUT}$ terminal to a common bus 504. Each RGD IC 502*x* includes a PGOOD terminal (pin) that is coupled through a resistor R to a pull-up voltage $V_{DD}$. In the illustrated example, RGD ICs 502*a*, 502*b*, and 502*c* each output a full gate-drive current (e.g., 9A each), while RGD IC 502*d* outputs a reduced gate-drive current (e.g., 4A) as it transitions from an OFF state (due to phase shedding) to an ON state.

Figure 6:
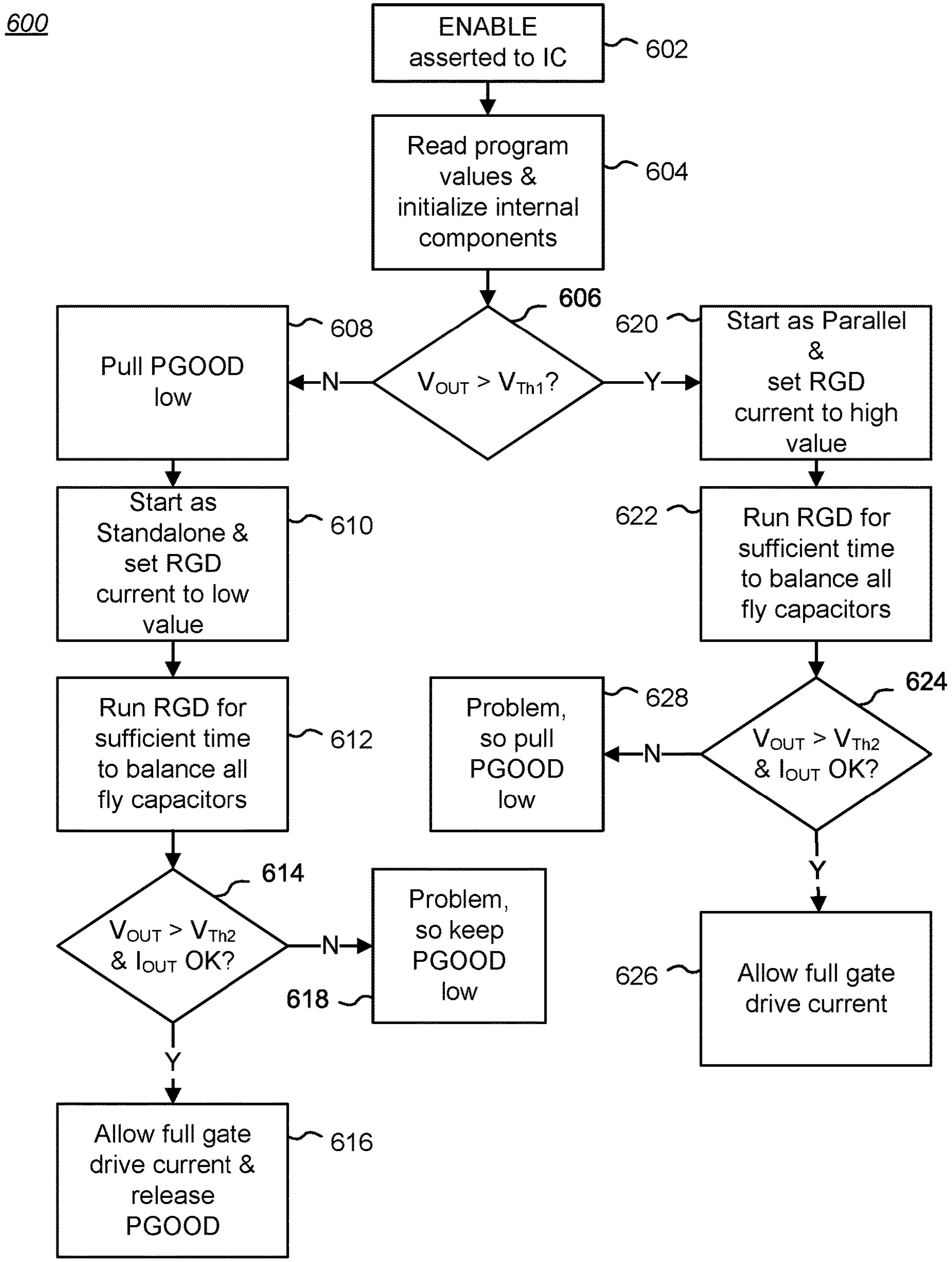
FIG. 6 is a process flow chart showing one method that allows for phase shedding within a parallel power converter system.

FIG. 6 is a process flow chart 600 showing one method that allows for phase shedding within a parallel power converter system. The illustrated steps depict how one power converter within the parallel system can be powered up from an OFF (or reduced-current) state and contribute power to the common output without affecting the other parallel power converters.

Referring to FIG. 6, to bring an individual power converter online, a controller (not shown) asserts an ENABLE signal (e.g., by setting an ENABLE pin of the power converter to a logic high) [Block 602]. The individual power converter may then read programmed values (e.g., through a general-purpose input/output digital signal pin or from internal memory) and initialize internal components (e.g., programmable resistances and internal trimmed parameters) [Block 604].

The power converter reads the common output voltage $V_{OUT}$ (or a voltage indicative of $V_{OUT}$, such as the voltage across one of the fly capacitors) and compares that measured voltage (e.g., $V_{OUT}$) to a first threshold voltage $V_{Th1}$ to determine if the power converter is in a standalone (non-parallel) or a parallel configuration [Block 606]. The value of the threshold voltage $V_{Th1}$ may be determined in several ways, such as a percentage of $V_{OUT}$, or as a fixed voltage below the ideal output value for $V_{OUT}$. If $V_{OUT} \leq V_{Th1}$ (or, in the alternative, $V_{OUT} < V_{Th1}$) then no other power converter is connected to the common output (or the system is in a fault condition). Accordingly, the power converter starts up by pulling its PGOOD pin low [Block 608], and sets the RGD current to a low value (e.g., 700 mA), thus allowing the normal standalone charge balancing and soft-start phases to proceed[Block 610]. Setting a low RGD current value limits potentially harmful current in-rush resulting from the possibly large differential between $V_{IN}$ to the power converter and $V_{OUT}$ (which may be zero volts) and limits power dissipation and attendant over-heating within the power converter (particularly in fault cases such as shorted output terminals).

The RGD current is limited for a sufficient time to ensure that all fly capacitors are balanced [Block 612]. If $V_{OUT}$ is greater than a second threshold voltage $V_{Th2}$ (which may be the same as the $V_{Th1}$ in some embodiments), and the output current $I_{OUT}$ is within selected parameter values (e.g., no short circuit, no over current) [Block 614], then the power converter may release PGOOD and allow full gate drive current [Block 616], otherwise an issue has been detected and the power converter signals that state by keeping PGOOD low [Block 618]. The value of the threshold voltage $V_{Th2}$ may be determined in a similar manner as the value of the threshold voltage $V_{Th1}$ (although not necessarily exactly the same manner and not necessarily the same values). Note that in the illustrated configuration, all other power converters are generally configured to stop working if PGOOD is held low by any power converter, as the assumption is made that the system as a whole cannot provide sufficient power to a load.

If $V_{OUT} > V_{Th1}$ in BLOCK 606 (or, in the alternative, $V_{OUT} \geq V_{Th1}$), then at least one other operational power converter is connected to the common output. In this case, the initial power converter does not pull its PGOOD pin low. Instead, the power converter starts a parallel configuration sequence that includes setting its RGD current to a high value (e.g., 4 A) that quickly balances the charge on the power converter fly capacitors [Block 620]. A higher RGD current may be used since the voltage differential between $V_{IN}$ and $V_{OUT}$ is less than in the standalone configuration. For example, if $V_{IN}$=10V to a power converter configured in a divide-by-two mode of operation and for 4 A of current through the associated power FET $M_{CPx}$, and the initial output is 4.5V, then $V_{IN}/2-V_{OUT}$=0.5V; 4 A at 0.5V is 2 W, which is low enough that the power converter should not overheat.

The RGD current is limited for a sufficient time to ensure that all fly capacitors are balanced [Block 622]. Of note, because the current through the power FETs $M_{CPx}$ is limited by the reduced gate drive to at least one power FET $M_{CPx}$ in a power converter, that power converter can supply some power immediately to the common output while concurrently completing the charge balancing and soft-start phases—no extra waiting periods are required.

If $V_{OUT}$ is greater than a second threshold voltage $V_{Th2}$, and the output current $I_{OUT}$ is within selected parameter values (e.g., no short circuit, no over current) [Block 624], then the power converter may allow full gate drive current [Block 626], otherwise an issue has been detected and the power converter signals that state by pulling PGOOD low [Block 628]. Again, in the illustrated configuration, all other power converters are generally configured to stop working if PGOOD is held low by any power converter, as the assumption is made that the system as a whole cannot provide sufficient power to a load.

If the fly capacitors in an RGD power converter are out of charge balance, there are several options for achieving charge balance, all of which can take a short time to rectify as the entire power converter balances while switching. For example, if the fly capacitors are over-charged, then current may be back-flowed from $V_{OUT}$ to $V_{IN}$ (assuming that the connected power supply at $V_{IN}$ is rechargeable), switching may be paused or reconfigured until $V_{OUT}$ falls so that the excess charge may be discharged to the output of the power converter, and/or excess charge may be dumped to ground. If the fly capacitors are under-charged, then they may be balanced from the output (i.e., the capacitors are charged from the output), the RGD current from $V_{IN}$ may be increased to compensate for the balancing current, and/or the RGD switch current limit for each power FET $M_{CPx}$ may be changed to assist in charge balancing.

One way of summarizing the embodiment described above is that it enables application of an output of a first power converter having an RGD capability to an output of at least a second power converter by enabling the RGD capability of the first power converter to limit current through the output of the first power converter to a first level and for a sufficient time to balance charge of the at least one fly capacitor connected to the first power converter. If the output voltage of the first power converter is greater than a threshold voltage, then the RGD capability of the first power converter is disabled, allow full gate-drive operation.

Startup of Parallel Power-Converters

A useful adjunct to the phase shedding embodiments of the present invention are circuits and methods for speeding up the startup of parallel power-converters, including power-converters that lack an RGD capability. One embodiment of the present invention repurposes the functions of existing pins of a power converter to indicate a parallel or non-parallel configuration, and to indicate that a particular power converter has completed charge balancing. The result is a substantial shortening of the startup of a set of power converters connected in parallel to a common output.

Figure 7:
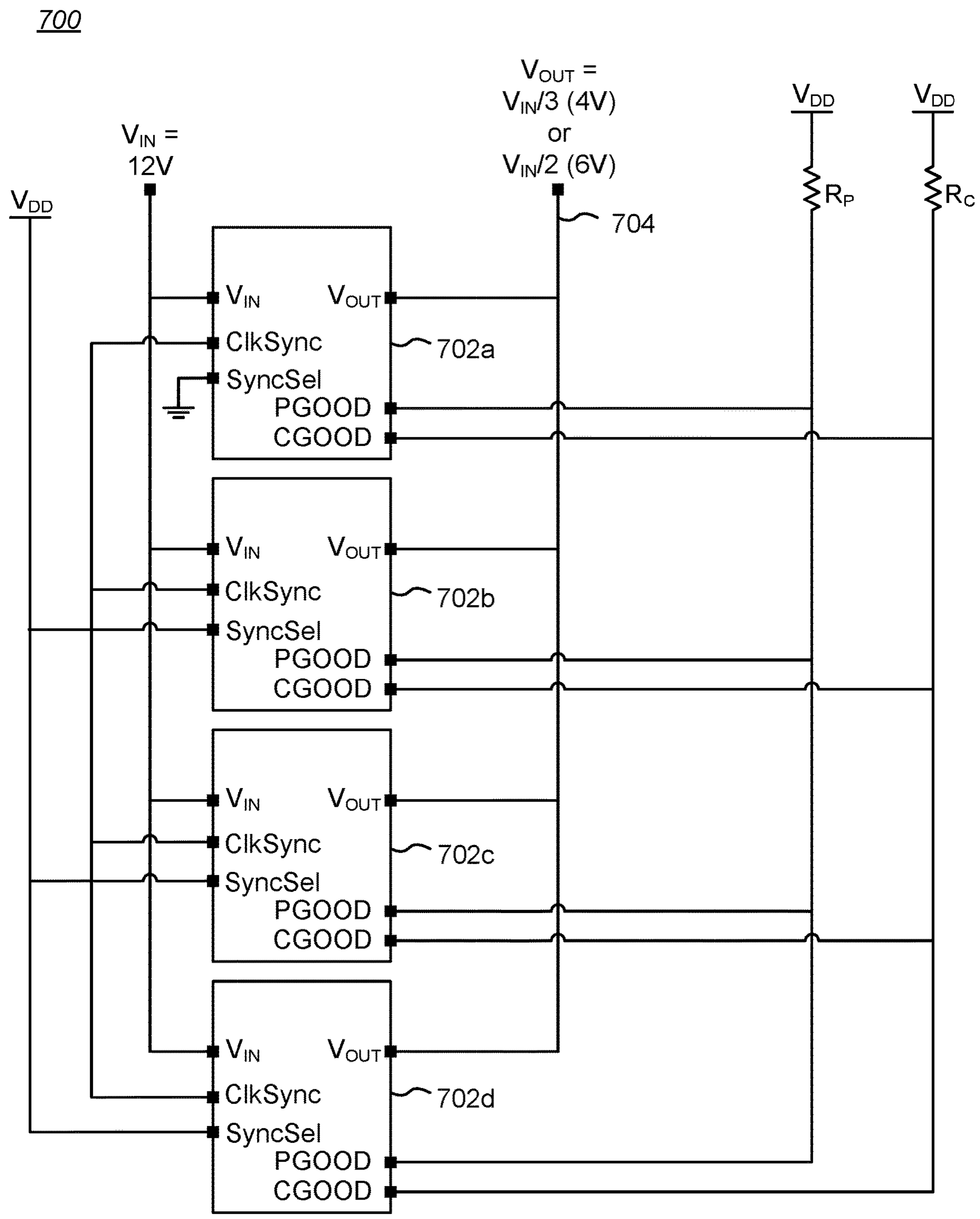
FIG. 7 is a block diagram showing four parallel selectable conversion ratio (divide-by-3 or divide-by-2) power converter ICs coupled in parallel.

FIG. 7 is a block diagram showing four parallel selectable conversion ratio (divide-by-3 or divide-by-2) power converter ICs 702*a*-702*d* (generically, "702*x*") coupled in parallel. In the illustrated example, each IC 702*x* has a $V_{IN}$ terminal coupled to a 12V voltage source (e.g., a battery) and selectively outputs either 4V or 6V from a $V_{OUT}$ terminal to a common bus 704. Each IC 702*x* includes a conventional open-drain PGOOD terminal (pin) that is coupled through a resistor $R_P$ to a pull-up voltage (e.g., $V_{DD}$). (Note that the discussion of FIG. 7, while focused on IC embodiments of power converters, applies to non-IC embodiments as well).

When any of the ICs 702*x* is used in a stand-alone (non-parallel) configuration, a sync-select (SyncSel) pin is grounded. However, in a repurposed version of the ICs 702*x*, coupling the SyncSel pin to a pull-up voltage (e.g., $V_{DD}$) indicates to the existing internal circuitry (reprogrammed accordingly) of each IC 702*x* that the IC is coupled in parallel with other similar ICs. In addition, one IC (e.g., IC 702*a*) has its SyncSel pin grounded to indicate that such IC is the primary controlling IC for the parallel set of ICs. The primary controlling IC provides a clock signal via its ClkSync pin to the other power converter ICs (through their ClkSync pins) so that they all switch at the same time; without this shared clock signal, some power converter ICs may run close to, but not completely, synchronously.

In the illustrated example, each IC 702*x* includes an open-drain CGOOD pin coupled through a resistor $R_C$ to a pull-up voltage (e.g., $V_{DD}$). Each IC 702*x* also includes a PGOOD pin coupled through a resistor $R_P$ to a pull-up voltage $V_{DD}$.

Figure 1B:
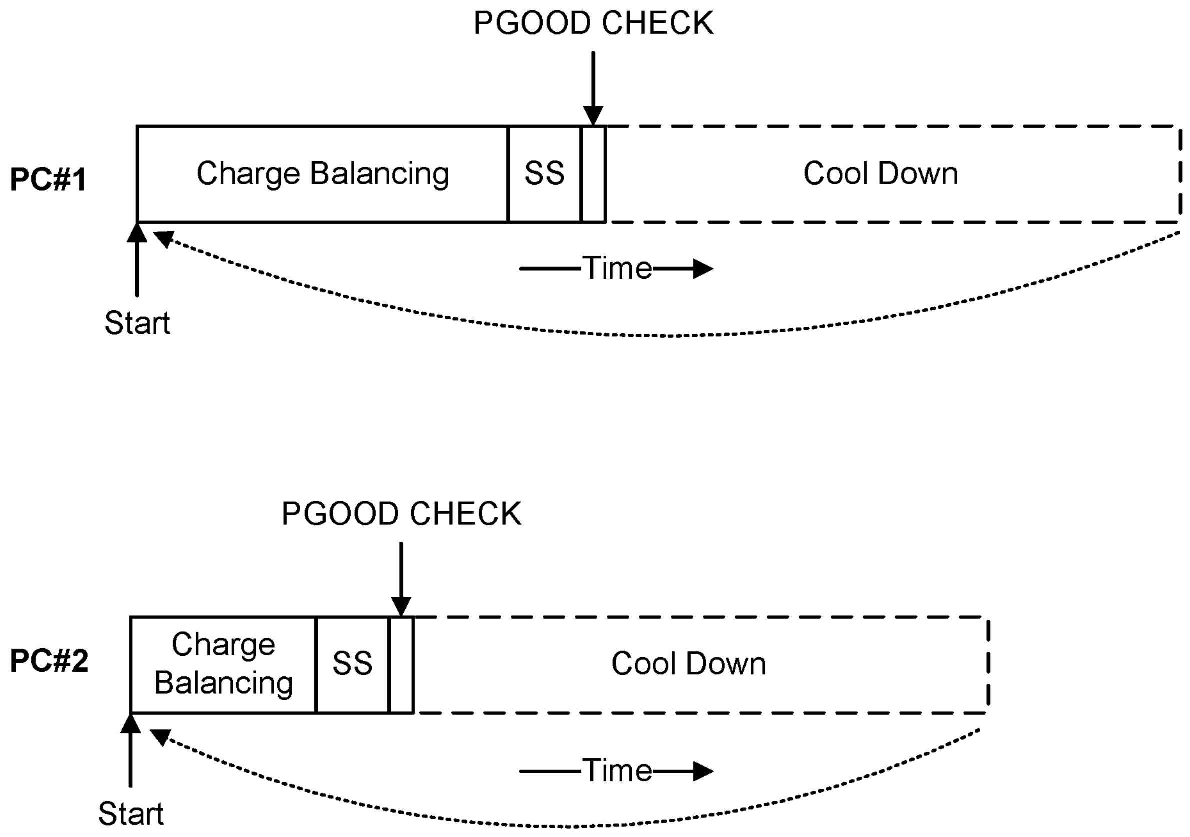
FIG. 1B (Prior Art)
FIG. 1B is a diagram of state versus time showing an example of the difference in time of the occurrences of PGOOD checks for two power converters, PC #1 and PC #2, caused by different charge balancing phase durations.

It should be noted that charge balancing requires very little current, and hence during the charge balancing phase, the ICs 702*x* should not heat up to a significant degree. On the other hand, the soft-start phase allows an appreciable current to flow through the ICs 702*x*, potentially causing overheating if all of the ICs have not in sync to provide power to a load. In terms of time, the charge balancing phase is generally the most variable startup phase across a set of parallel ICs 702*x* (e.g., 0 to 30 mS per IC in some instances), while the soft-start phase is generally of relatively uniform and short duration for each IC 702*x* (e.g., tens of microseconds). FIG. 1B illustrates an example of the difference in time of the occurrences of PGOOD checks for two power converter ICs, PC #1 and PC #2, caused by different charge balancing phase durations.

The CGOOD pin is essentially used as a second PGOOD pin that serves as an indicator by each IC 702*x* that the IC has completed fly capacitor charge balancing. Thus, each IC 702*x* holds up commencement of the power-consuming soft-start phase until all ICs 702*x* indicate, via the state of a shared CGOOD signal, that they have completed their respective charge balancing phase and are essentially synchronized. Once the shared CGOOD signal indicates that the charge balancing phase for all ICs 702*x* has completed, all of the ICs 702*x* may start the relatively short and uniform duration soft-start phase. The PGOOD pin still serves to indicate that all of the ICs 702*x* have successfully completed the soft-start phase and are ready to enter a full power mode of operation.

Figure 8:
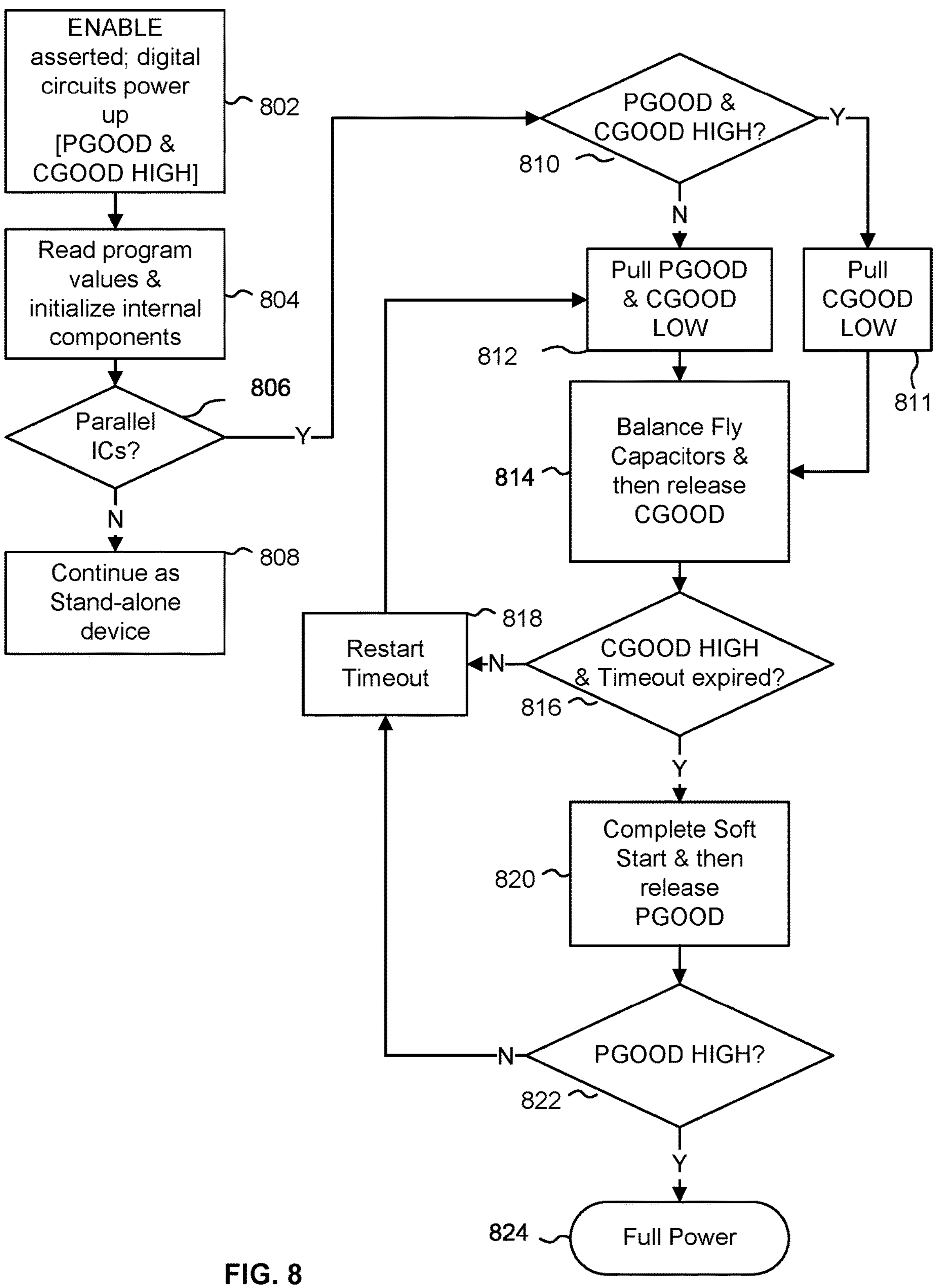
FIG. 8 is a process flow chart showing one method that allows for fast startup of parallel power converters.

FIG. 8 is a process flow chart showing one method that allows for fast startup of parallel power converter ICs. (Note that the discussion of FIG. 8, while focused on IC embodiments of power converters, applies to non-IC embodiments as well). Each parallel power converter IC 702*x* receives an ENABLE signal from a controller (not shown) and internal digital circuitry is powered up [Block 802]. At this point, the pull-up resistors $R_C$ and $R_P$ maintain the CGOOD and PGOOD pins at a HIGH state. The individual ICs 702*x* may then read programmed values (e.g., through a general-purpose input/output digital signal pin) and initialize internal components (e.g., programmable resistances and internal trimmed parameters) [Block 804].

An internal check of the state of the SyncSel pin determines whether an IC 702*x* is configured to be in a parallel or standalone mode of operation [Block 806]. If in a standalone configuration, the IC 702*x* continues conventional operation [Block 808]. If in a parallel configuration, the IC 702*x* checks the state of the CGOOD and PGOOD pins [Block 810]. If both the CGOOD and PGOOD pins are HIGH (indicating that all other ICs 702*x* have completed charge balancing and soft-start), the IC 702*x* pulls its CGOOD pin LOW [Block 811] and the process continues at Block 814; otherwise, the IC 702*x* pulls both of its CGOOD and PGOOD pins LOW to indicate that the IC 702*x* has not completed charge balancing and is not ready for full power operation [Block 812]. Thereafter, the IC 702*x* charge balances its fly capacitors and then releases its CGOOD pin (e.g., lets CGOOD go to HIGH if it was at LOW) [Block 814].

After charge balancing is complete, the IC 702*x* checks whether its CGOOD pin is HIGH and a timeout period (e.g., 320 mS) has expired [Block 816]. If not, then the IC 702*x* essentially enters a loop, resetting the timeout period to zero [Block 818] and looping to Block 812. Of note, the duration of Block 814 (charge balancing the fly capacitors) normally will be significantly shorter, since at least one round of charge balancing has occurred.

If the CGOOD pin of the IC 702*x* is HIGH (indicating, importantly, that all other ICs 702*x* have completed charge balancing) and the timeout period has expired, then the IC 702*x* can commence and complete its soft-start phase, at which point the PGOOD pin of the IC 702*x* is released if it had been pulled low at Block 812 [Block 820]. The IC 702*x* then checks whether the PGOOD pin is HIGH, indicating that all other ICs 702*x* have completed the soft-start phase without problems (e.g., over-current or under-current conditions) [Block 822]. If the PGOOD pin is HIGH, then the IC 702*x* can proceed to a normal full power mode of operation [Block 824]. If the PGOOD pin is LOW, then the IC 702*x* essentially enters a loop, resetting the timeout period to zero [Block 818] and looping to Block 812.

The CGOOD check at Block 816 allows an IC 702*x* to avoid prematurely entering the soft-start phase until all ICs 702*x* have completed the charge balancing phase. If looping is required at the CGOOD check, the duration of charge balancing normally will be significantly shorter, since at least one round of charge balancing will have occurred. The short duration of charge balancing if looping occurs (possibly close to—even very close to—zero seconds) helps synchronize all of the ICs 702*x*. Once no IC 702*x* is holding its CGOOD pin LOW, then all of the ICs 702*x* may proceed with the soft-start (SS) phase. In most cases, no cool down period should be needed (if cool down is needed, the process loops back to the charge balancing phase). Further, use of the CGOOD flag allows an IC 702*x* that has been shed to come back online by permitting charge balancing to occur without pulling PGOOD low, which would disrupt the other power converters (turn them OFF).

Figure 9A:
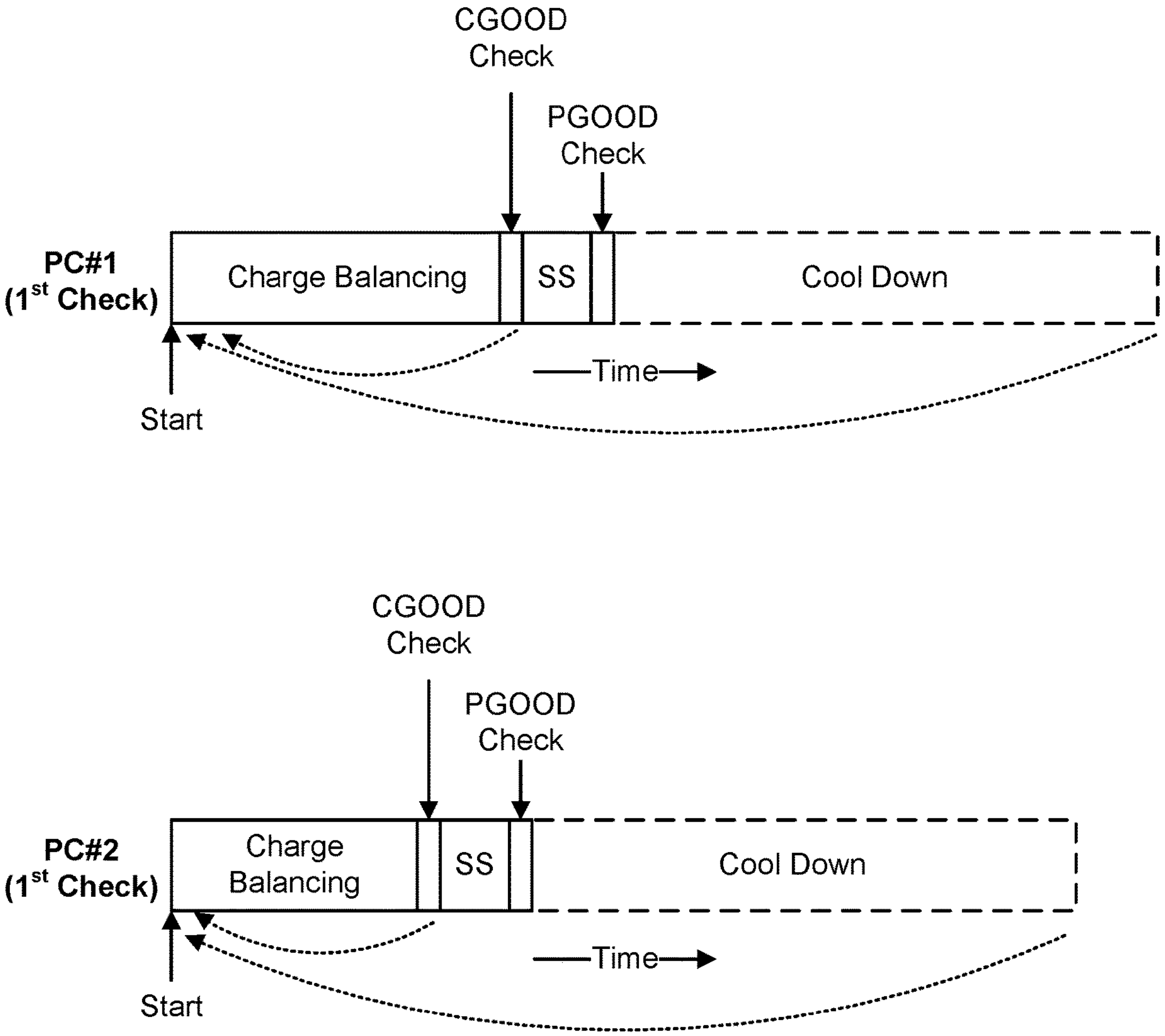
FIG. 9A is a diagram of state versus time showing an example of the difference in time of the occurrences of CGOOD and PGOOD checks for a pair of power converters, PC #1 and PC #2, relative to respective first charge balancing phase durations.

FIG. 9A is a diagram of state versus time showing an example of the difference in time of the occurrences of CGOOD and PGOOD checks for a pair of power converter ICs, PC #1 and PC #2, relative to respective first charge balancing phase durations. The CGOOD check periods do not overlap, so both power converter ICs loop back to Block 812 in FIG. 8.

Figure 9B:
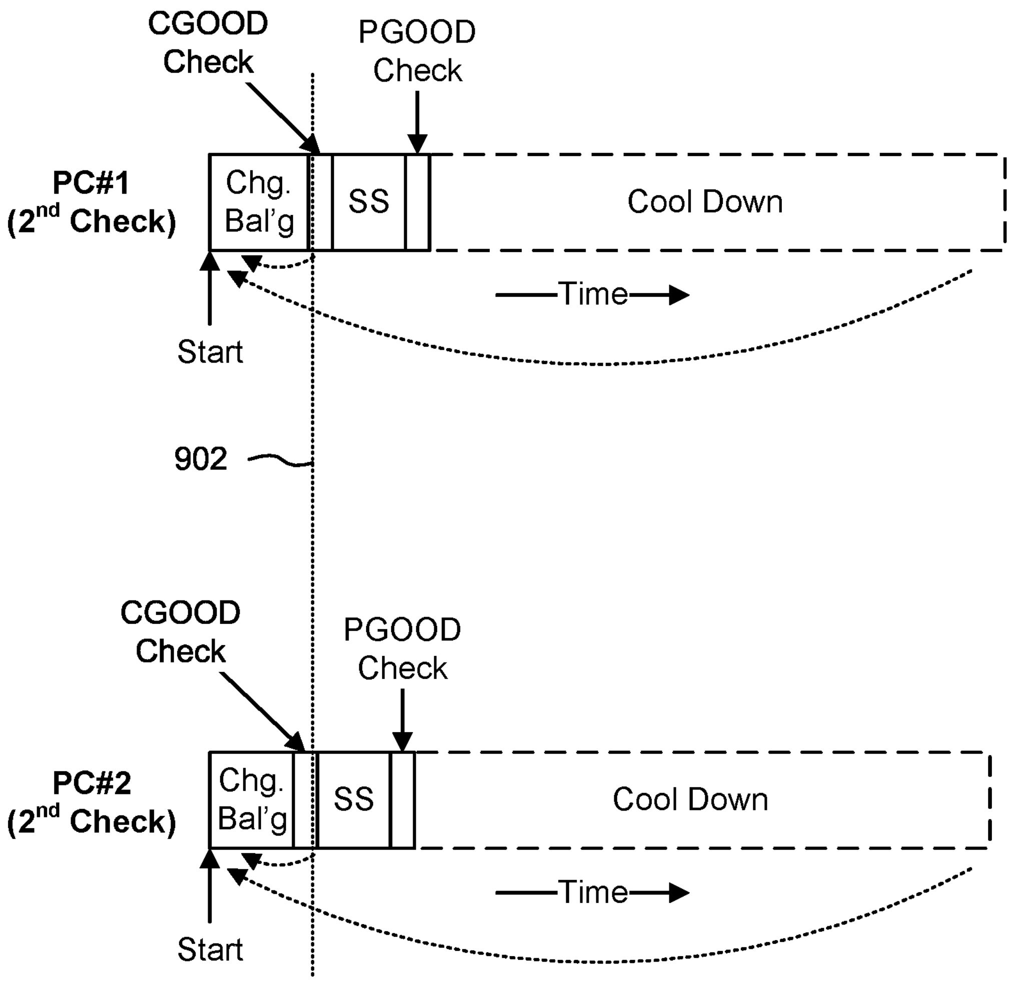
FIG. 9B is a diagram of state versus time showing an example of the difference in time of the occurrences of CGOOD and PGOOD checks for a pair of power converters, PC #1 and PC #2, relative to respective second charge balancing phase durations.

FIG. 9B is a diagram of state versus time showing an example of the difference in time of the occurrences of CGOOD and PGOOD checks for a pair of power converter ICs, PC #1 and PC #2, relative to respective second charge balancing phase durations. The CGOOD check periods do overlap, as indicated by dotted line 902, so both power converter ICs proceed to the soft-start phase (Block 820 in FIG. 8).

One way of summarizing the CGOOD aspects of the embodiment described above is that it provides for fast startup of a plurality of power converter ICs connected in parallel to a common output, in which each one of the plurality of power converter ICs: sets a first indicator signal (CGOOD) to a first state (e.g., LOW) to indicate that charge balancing of the power converter IC has not completed; balances charge on at least one fly capacitor connected to the power converter IC; sets the first indicator signal to a second state (e.g., HIGH) to indicate that charge balancing of the power converter IC has completed; and waits for receipt of first indicator signals in the second state from all other power converter ICs and then performs a soft-start of the power converter IC.

A power converter system, including a plurality of a power converter integrated circuits (IC) having a reduced-gate drive (RGD) capability connected in parallel to a common output, wherein each one of the plurality of power converters is configured to:

a. set a first indicator signal to a first state to indicate that charge balancing of the power converter has not completed;
b. balance charge on at least one fly capacitor connected to the power converter;
c. set the first indicator signal to a second state to indicate that charge balancing of the power converter has completed; and
d. wait for receipt of first indicator signals in the second state from all other power converters and then perform a soft-start of the power converter.

Fast startup of parallel power-converter ICs by repurposing the functions of existing pins of a power converter IC and using the techniques described above may be combined with the reduced gate drive LDO embodiments described above that enable phase shedding. The combination would increase efficiency and reduce power by allowing both fast startup and phase shedding in sets of parallel power converter ICs.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or circuits (e.g., filters, amplifiers, passive components, and possibly additional ICs) into one package. The ICs and/or modules are then typically combined with other components, often on a printed circuit board, to form part of an end-product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 10:
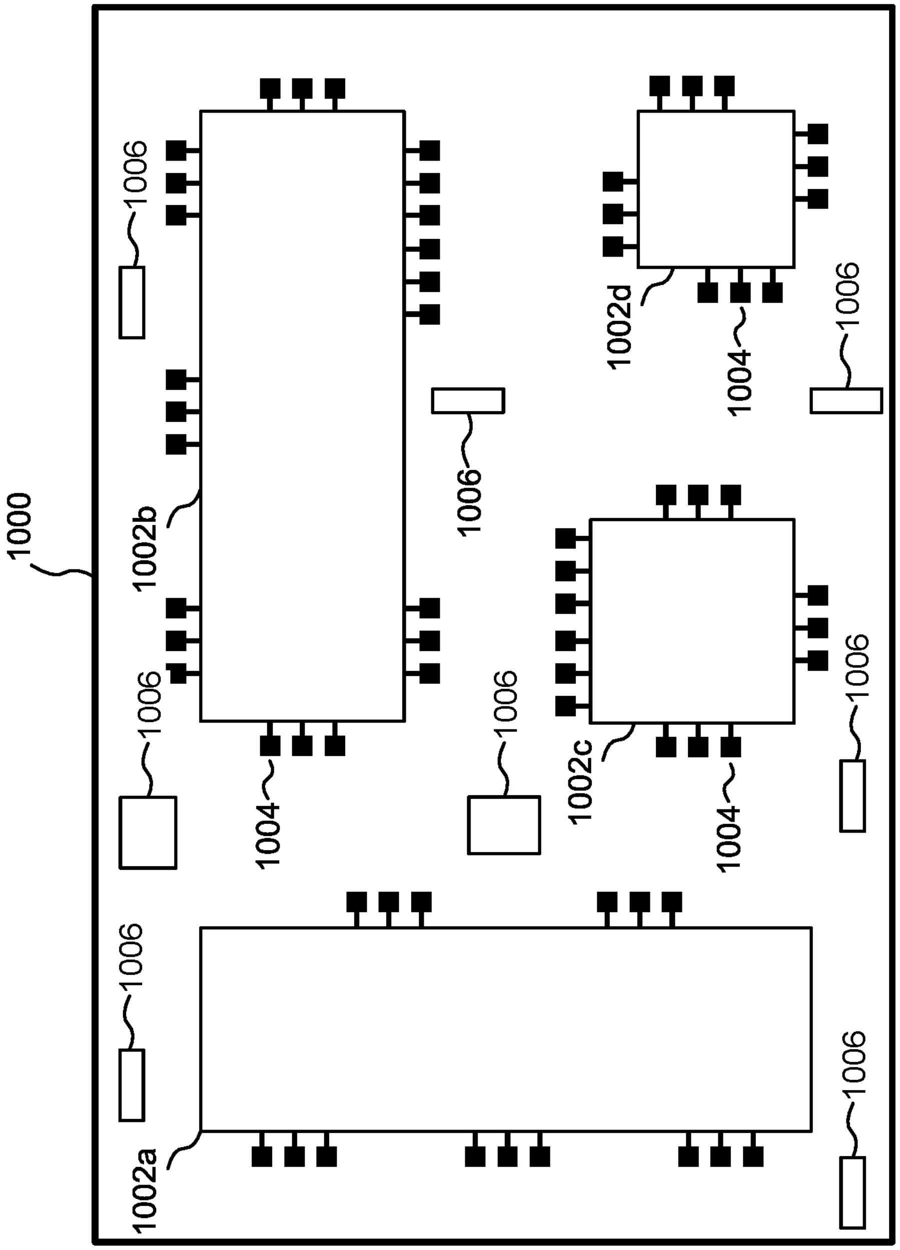
FIG. 10 is a top plan view of a substrate that may be, for example, a printed circuit board or chip module substrate (e.g., a thin-film tile).

As one example of further integration of embodiments of the present invention with other components, FIG. 10 is a top plan view of a substrate 1000 that may be, for example, a printed circuit board or chip module substrate (e.g., a thin-film tile). In the illustrated example, the substrate 1000 includes multiple ICs 1002*a*-1002*d* having terminal pads 1004 which would be interconnected by conductive vias and/or traces on and/or within the substrate 1000 or on the opposite (back) surface of the substrate 1000 (to avoid clutter, the surface conductive traces are not shown and not all terminal pads are labelled). The ICs 1002*a*-1002*d* may embody, for example, signal switches, active filters, amplifiers (including one or more LNAs), and other circuitry. For example, IC 1002*b* may incorporate one or more instances of a power converter like the circuits shown in FIGS. 2, 3, 5, and 7.

The substrate 1000 may also include one or more passive devices 1006 embedded in, formed on, and/or affixed to the substrate 1000. While shown as generic rectangles, the passive devices 1006 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 1000 to other passive devices 1006 and/or the individual ICs 1002*a*-1002*d*. The front or back surface of the substrate 1000 may be used as a location for the formation of other structures.

System Aspects

The current invention improves a system architecture by allowing one or more power converter ICs to be turned OFF to improve light load efficiency. Improved power converter efficiency may result in lower power usage and longer battery life.

Note that not all power converter ICs need have an RGD capability. For example, with two power converter ICs coupled in parallel, only one power converter IC might have an RGD capability, allowing phase shedding of that unit (leaving the non-RGD power converter IC to be operated in either ON or OFF states). As another example, a primary (always ON) power converter IC does not require an RGD capability.

Embodiments of the present invention are useful in a wide variety of larger radio frequency (RF) circuits and systems for performing a range of functions, including (but not limited to) impedance matching circuits, RF power amplifiers, RF low-noise amplifiers (LNAs), phase shifters, attenuators, antenna beam-steering systems, charge pump devices, RF switches, etc. Such functions are useful in a variety of applications, such as radar systems (including phased array and automotive radar systems), radio systems (including cellular radio systems), and test equipment.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, 6G, and WiFi (e.g., 802.11a, b, g, ac, ax, be) protocols, as well as other radio communication standards and protocols.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar junction transistors (BJTs), BiCMOS, LDMOS, BCD, GaAs HBT, GaN HEMT, GaAs pHEMT, MESFET, InP HBT, InP HEMT, FinFET, GAAFET, and SiC-based power device technologies, using 2-D, 2.5-D, and 3-D structures. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A method of coupling an output of a first power converter to an output of at least a second power converter, including:

enabling a reduced-gate drive (RGD) capability of the first power converter to limit current through the output of the first power converter to one or more levels and for a sufficient time to balance charge of at least one fly capacitor connected to the first power converter; and coupling the output of the second power converter to the output of the first power converter after the charge on the at least one fly capacitor exceeds a specified threshold.

2. The method of claim 1, further including disabling the RGD capability of the first power converter if an output voltage of the first power converter is greater than a threshold voltage.

3. The method of claim 1, further including disabling the RGD capability of the first power converter if a voltage of the at least one fly capacitor approaches a target voltage.

4. The method of claim 1, further including setting a power-good signal line of the first power converter to a first state if an output voltage of the first power converter is not greater than a threshold voltage.

5. The method of claim 1, further including enabling the RGD capability of the first power converter if a fault event occurs affecting the first power converter.

6. The method of claim 1, further including enabling the RGD capability of the first power converter during dynamic re-configuration of a conversion ratio of the first power converter.

7. The method of claim 1, further including enabling the RGD capability of the first power converter when re-balancing charge on the at least one fly capacitor connected to the first power converter.

8. A method of applying an output of a first power converter having a reduced-gate drive (RGD) capability to an output of at least a second power converter, the method including:

enabling and initializing the first power converter;

comparing a voltage indicative of an output voltage of the first power converter to a first threshold voltage to determine if the first power converter is in a standalone or parallel configuration; and if the voltage indicative of the output voltage of the first power converter is greater than the first threshold voltage, then:

starting the first power converter in a parallel configuration;

enabling the RGD capability of the first power converter to limit current through the output of the first power converter to a first level and for a sufficient time to balance charge of at least one fly capacitor connected to the first power converter; and if the output voltage of the first power converter is greater than a second threshold voltage, then disabling the RGD capability of the first power converter.

9. The method of claim 8, further including, if the output voltage of the first power converter is not greater than the second threshold voltage, then setting a power-good signal line of the first power converter to a first state.

10. The method of claim 8, further including re-enabling the RGD capability of the first power converter if a fault event occurs affecting the first power converter.

11. The method of claim 8, further including re-enabling the RGD capability of the first power converter during dynamic re-configuration of a conversion ratio of the first power converter.

12. The method of claim 8, further including re-enabling the RGD capability of the first power converter when re-balancing charge on the at least one fly capacitor connected to the first power converter.

13. A method of operating a first power converter having a reduced-gate drive (RGD) capability in one of a standalone configuration or a parallel configuration in which an output of the first power converter is applied to an output of at least a second power converter, the method including:

enabling and initializing the first power converter;

comparing a voltage indicative of an output voltage of the first power converter to a first threshold voltage to determine if the first power converter is in a standalone or parallel configuration;

if the voltage indicative of the output voltage of the first power converter is less than the first threshold voltage, then:

setting a power-good signal line of the first power converter to a first state;

starting the first power converter in a non-parallel configuration;

enabling the RGD capability of the first power converter to limit current through the output of the first power converter to a first level and for a sufficient time to balance charge of at least one fly capacitor connected to the first power converter;

if the output voltage of the first power converter is greater than a second threshold voltage, then setting the power-good signal line of the first power converter to a second state and disabling the RGD capability of the first power converter; and if the output voltage of the first power converter is not greater than the second threshold voltage, then maintaining the power-good signal line of the first power converter in the first state; and if the output voltage of the first power converter is not less than the first threshold voltage, then:

starting the first power converter in a parallel configuration;

enabling the RGD capability of the first power converter to limit current through the output of the first power converter to a second level and for a sufficient time to balance charge of the at least one fly capacitor connected to the first power converter;

if the output voltage of the first power converter is greater than the second threshold voltage, then disabling the RGD capability of the first power converter; and if the output voltage of the first power converter is not greater than the second threshold voltage, then setting the power-good signal line of the first power converter to the first state.

14. The method of claim 13, further including re-enabling the RGD capability of the first power converter if a fault event occurs affecting the first power converter.

15. The method of claim 13, further including re-enabling the RGD capability of the first power converter during dynamic re-configuration of a conversion ratio of the first power converter.

16. The method of claim 13, further including re-enabling the RGD capability of the first power converter when re-balancing charge on the at least one fly capacitor connected to the first power converter.

* * * * *